United States Patent
Son et al.

(10) Patent No.: US 11,018,706 B2
(45) Date of Patent: *May 25, 2021

(54) ANTENNA DEVICE AND ELECTRONIC DEVICE INCLUDING SAME

(71) Applicant: Samsung Electronics Co., Ltd., Suwon-si (KR)

(72) Inventors: Gunhee Son, Gumi-si (KR); Hyeongwoo Kim, Busan (KR); Soon-Sang Park, Daegu (KR); Seunghyun Yeo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,493

(22) Filed: Mar. 12, 2020

(65) Prior Publication Data

US 2020/0212947 A1 Jul. 2, 2020

Related U.S. Application Data

(63) Continuation of application No. 16/284,966, filed on Feb. 25, 2019, now Pat. No. 10,594,344, which is a
(Continued)

(30) Foreign Application Priority Data

Jul. 28, 2015 (KR) .................. 10-2015-0106687

(51) Int. Cl.
*H04B 1/04* (2006.01)
*H01Q 1/24* (2006.01)
(Continued)

(52) U.S. Cl.
CPC .......... *H04B 1/0483* (2013.01); *H01Q 1/243* (2013.01); *H01Q 5/328* (2015.01); *H01Q 5/371* (2015.01);
(Continued)

(58) Field of Classification Search
CPC combination set(s) only.
See application file for complete search history.

(56) References Cited

U.S. PATENT DOCUMENTS

| 8,798,554 B2 | 8/2014 | Darnell et al. |
| 8,907,853 B2 | 12/2014 | Ying |
(Continued)

FOREIGN PATENT DOCUMENTS

| CN | 101488772 A | 7/2009 |
| CN | 103326124 A | 9/2013 |
(Continued)

OTHER PUBLICATIONS

The International Searching Authority, "International Search Report," International Application No. PCT/KR2016/008184, dated Nov. 10, 2016, 3 pages, publisher The ISA/KR, International Application Division, Korean Intellectual Property Office, Daejeon, Republic of Korea.

(Continued)

*Primary Examiner* — Junpeng Chen

(57) ABSTRACT

Various embodiments provide an antenna device that includes: a metal member configured to have a length that contributes to at least a part of an electronic device; a printed circuit board (PCB) configured to be feed-connected to a preset position of the metal member in order to apply the metal member as an antenna radiator; and at least one electronic component electrically connected to a position different from the feeding position of the metal member and grounded to the PCB, and provide an electronic device that includes the same. Accordingly, the antenna device is grounded to the PCB in a desired position of the metal member by using the basically provided electronic component so that it is possible to exclude a separate electrical connection member, thereby reducing the cost, increasing
(Continued)

the use of space, enhancing the degree of freedom of the design of the antenna radiator.

18 Claims, 21 Drawing Sheets

Related U.S. Application Data continuation of application No. 15/222,899, filed on Jul. 28, 2016, now Pat. No. 10,218,396.

(51) Int. Cl.
| | |
|---|---|
| *H01Q 9/04* | (2006.01) |
| *H01Q 9/14* | (2006.01) |
| *H01Q 21/28* | (2006.01) |
| *H01Q 5/328* | (2015.01) |
| *H01Q 5/371* | (2015.01) |
| *H01Q 1/50* | (2006.01) |
| *H04W 88/06* | (2009.01) |

(52) U.S. Cl.
CPC ............ *H01Q 9/0421* (2013.01); *H01Q 9/145* (2013.01); *H01Q 21/28* (2013.01); *H01Q 1/50* (2013.01); *H04W 88/06* (2013.01)

(56) References Cited

U.S. PATENT DOCUMENTS

| | | | |
|---|---|---|---|
| 9,130,279 | B1 | 9/2015 | Lee et al. |
| 9,337,539 | B1 | 5/2016 | Ananthanarayanan et al. |
| 9,484,631 | B1 | 11/2016 | Napoles et al. |
| 9,548,787 | B1 | 1/2017 | Lee |
| 10,622,702 | B2 | 4/2020 | Guo |
| 2007/0120748 | A1 | 5/2007 | Jenwatanavet et al. |
| 2009/0167617 | A1 | 7/2009 | Nishio |
| 2009/0303135 | A1 | 12/2009 | Reed et al. |
| 2010/0331050 | A1 | 12/2010 | Tahk et al. |
| 2011/0263289 | A1 | 10/2011 | Vance |
| 2012/0092220 | A1 | 4/2012 | Tani et al. |
| 2012/0169568 | A1 | 7/2012 | Oh et al. |
| 2012/0299785 | A1 | 11/2012 | Bevelacqua |
| 2013/0214979 | A1 | 8/2013 | McMilin et al. |
| 2013/0257659 | A1 | 10/2013 | Darnell et al. |
| 2014/0111684 | A1 | 4/2014 | Corbin et al. |
| 2014/0329558 | A1 | 11/2014 | Darnell et al. |
| 2015/0084817 | A1 | 3/2015 | Yong |
| 2015/0349404 | A1 | 12/2015 | Wang |
| 2015/0372372 | A1 | 12/2015 | Lee et al. |
| 2016/0301139 | A1 | 10/2016 | Lombardi et al. |

FOREIGN PATENT DOCUMENTS

| | | |
|---|---|---|
| CN | 203242747 U | 10/2013 |
| CN | 103579740 A | 2/2014 |
| CN | 203589190 U | 5/2014 |
| CN | 203932323 U | 11/2014 |
| CN | 104701619 A | 6/2015 |
| CN | 204424426 U | 6/2015 |
| WO | 20150007952 A1 | 1/2015 |

OTHER PUBLICATIONS

The International Searching Authority, "Written Opinion," International Application No. PCT/KR2016/008184, dated Nov. 10, 2016, 4 pages, publisher The ISA/KR, International Application Division, Korean Intellectual Property Office, Daejeon, Republic of Korea.
European Patent Office, "European Search Report," Application No. 16181536.0-1811, dated Dec. 20, 2016, 11 pages, publisher EPO, Munich, Germany, place of search The Hague.
European Patent Office, "Communication pursuant to Article 94(3) EPC," Application No. EP16181536.0, dated Apr. 30, 2019, 9 pages.
National Intellectual Property Administration of the People'S Republic of China, "The First Office Action," Application No. CN 201610601231.7, dated Dec. 26, 2019, 28 pages.
European Patent Office, "Summons to attend proceedings pursuant to Rule 115(1) EPC," Application No. EP16181536.0, dated Jan. 30, 2020, 9 pages.
Lu et al., "LTE Terminal Antenna Technology and Testing", Telecommunications Network Technology, No. 1, Jan. 31, 2014, 6 pages.
Office Action dated Sep. 8, 2020 in connection with Chinese Patent Application No. 201610601231.7, 16 pages.
Result of consultation dated Jul. 2, 2020 in connection with European Patent Application No. 16 181 536.0, 5 pages.

ANTENNA DEVICE AND ELECTRONIC DEVICE INCLUDING SAME

CROSS-REFERENCE TO RELATED APPLICATIONS

This application is a continuation of application Ser. No. 16/284,966, filed Feb. 25, 2019, which is a continuation of application Ser. No. 15/222,899, filed Jul. 28, 2016, now U.S. Pat. No. 10,218,396, which claims priority to Korean Application No. 10-2015-0106687, filed, Jul. 28, 2015, the entire contents of which are hereby incorporated by reference.

BACKGROUND

1. Field

Various embodiments of the present disclosure relate to an electronic device, and for example, to an electronic device that includes an antenna device.

2. Description of Related Art

Electronic devices have become slimmer in order to meet consumers' needs as the functional gap therebetween has significantly decreased. Electronic device makers have made efforts to make electronic devices slim while increasing the rigidity thereof and improving the design. Reflecting this trend, the electronic devices have been developed to efficiently ensure an arrangement space of at least one antenna device that is necessarily required for communication among elements thereof in order to prevent degradation in radiation performance and to achieve an excellent performance.

Antenna devices used in electronic devices have an inverted-F antenna (IFA) or a monopole radiator as a basic structure, and a volume and/or a number of antenna radiators to be mounted may be determined according to frequency, bandwidth, and a type of each service. For example, although there is a difference in frequency between areas in the world, a low band of 700 megahertz (MHz) to 900 MHz, a mid-band of 1700 MHz to 2100 MHz, a high band of 2300 MHz to 2700 MHz, and the like are generally used as major communication bands. Additionally, various wireless communication services are used, such as Bluetooth (BT), global positioning system (GPS), WIFI, etc. However, it is difficult to ensure all the bands with only a single antenna in reality. Accordingly, in order to overcome the problems, multiple antennas are separately designed by collecting service bands (e.g., similar frequency bands) to satisfy all the aforementioned communication bands in a limited antenna volume of a given communication device.

For example, an antenna that performs voice/data communication (e.g., general packet radio service (GPRS), wideband code division multiple access (WCDMA), long term evolution (LTE), etc.)), which is the major communication system of a terminal device, may be located on a lower end portion of the terminal device where a small number of metal components that deteriorate the performance of the antenna are mounted. Based on the European standard, a total of 24 bands, including 2G (global system for mobile system (GSM)850, extended GSM(EGSM), digital communication system (DCS), and personal communication system (PCS)), WCDMA (B1, B2, B5, and B8), LTE (B1, B2, B3, B4, B5, B7, B8, B12, B17, B18, B19, B20, B26, B38, B39, B40, and B41), etc., have to be implemented. In fact, since it is difficult to satisfy service provider specifications and the specific absorption rate (SAR) standard and to minimize effects on human bodies while implementing all the bands with a single antenna, antennas may be implemented by collecting service bands having similar frequency bands over at least two areas. By way of example, 2G (GSM850, EGSM, DCS, and PCS), WCDMA (B1, B2, B5, and B8), and LTE (B1, B2, B3, B4, B5, B8, B12, B17, B18, B19, B20, B26, and B39) may be implemented with one antenna, and LTE (B7, B38, B40, and B41) may be implemented with another antenna.

Further, in a case where an exterior of an electronic device is constituted by a metal member (e.g., a metal bezel, etc.) in order to meet a recent trend, an antenna may not be separately designed, as opposed to a dielectric injection-molded material, and may be designed by making use of the metal member as an antenna radiator.

For example, in a case where a metal member arranged on the outer periphery of an electronic device is used as an antenna radiator, specific locations of the metal member are cut off by dielectric cut-off portions in order to adjust a physical length from a feeding part to the antenna, thereby enabling the antenna to operate in a desired frequency band.

In this case, a ground part has to be disposed in a corresponding position of the metal member in order to enable the metal member to operate in the desired frequency band, but there is a difficulty in that a mounting space has to be provided in order to add a separate electrical connection member (e.g., a C-clip, a conductive gasket, etc.) for a physical contact between the outer periphery of the metal member and the ground part of a printed circuit board (PCB).

SUMMARY

To address the above-discussed deficiencies, it is a primary object to provide an antenna device and an electronic device that includes the same.

Various embodiments may provide an antenna device that includes: a metal member configured to have a length that contributes to at least a part of an electronic device; a printed circuit board (PCB) configured to be feed-connected to a preset position of the metal member in order to apply the metal member as an antenna radiator; and at least one electronic component electrically connected to a position different from the feeding position of the metal member and grounded to the PCB, and may provide an electronic device that includes the same.

Various embodiments may provide an antenna device that includes: a metal member configured to have a length that contributes to at least a part of an electronic device; a printed circuit board (PCB) configured to be feed-connected to a preset position of the metal member in order to apply the metal member as an antenna radiator; and a side key assembly electrically connected to a position different from the feeding position of the metal member and grounded to the PCB, and may provide an electronic device that includes the same.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features, and advantages of the present disclosure will be more apparent from the following detailed description taken in conjunction with the accompanying drawings, in which.

DETAILED DESCRIPTION

Figure 1:
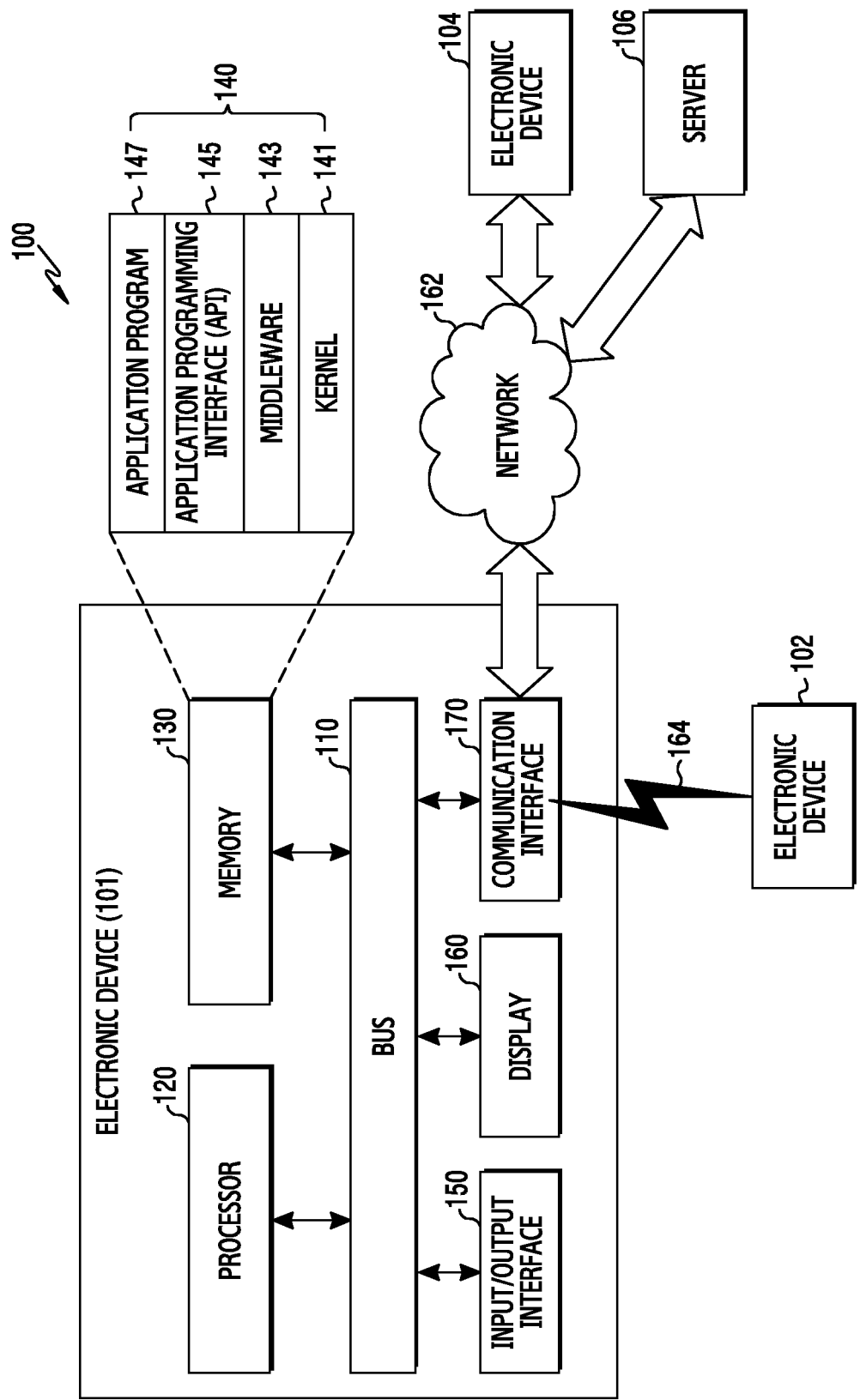
FIG. 1 illustrates a network environment including an electronic device according to various embodiments of the present disclosure.

FIGS. 1 through 13C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of certain embodiments of the present disclosure as defined by the claims and their equivalents. It includes specific details to assist in that understanding but these are to be regarded merely as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the specification or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B, or may include both A and B.

Although expressions used in various embodiments of the present disclosure, such as "1st", "2nd", "first", "second" may be used to express various constituent elements of the various embodiments of the present disclosure, these expressions are not intended to limit the corresponding constituent elements. For example, the above expressions are not intended to limit an order or an importance of the corresponding constituent elements. The above expressions may be used to distinguish one constituent element from another constituent element. For example, a first user device and the second user device are both user devices, and indicate different user devices. For example, a first constituent element may be referred to as a second constituent element, and similarly, the second constituent element may be referred to as the first constituent element without departing from the scope of the present disclosure.

When an element is mentioned as being "connected" to or "accessing" another element, this may mean that it is directly connected to or accessing the other element, or there may be intervening elements present between the two elements. On the other hand, when an element is mentioned as being "directly connected" to or "directly accessing" another element, it is to be understood that there are no intervening elements present.

The term "module" as used herein may imply a unit including one of hardware, software, and firmware, or a combination thereof. The term "module" may be interchangeably used with terms, such as unit, logic, logical block, component, circuit, and the like. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of an application-specific IC (ASIC) chip, a field-programmable gate arrays (FPGAs), or a programmable-logic device, which are known or will be developed and which perform certain operations.

By the term "substantially" it is meant that the recited characteristic, parameter, or value need not be achieved exactly, but that deviations or variations, including, but not limited to, for example, tolerances, measurement errors, measurement accuracy limitations and other factors known to persons of ordinary skill in the art, may occur in amounts that do not preclude the effect the characteristic was intended to provide.

Unless otherwise defined, all terms, including technical and scientific terms, used herein have the same meaning as commonly understood by those of ordinary skill in the art to which various embodiments of the present disclosure belong. It will be further understood that terms, such as those defined in commonly used dictionaries, should be interpreted as having meanings that are consistent with their meaning in the context of the relevant art and the various embodiments of the present disclosure, and should not be interpreted in an idealized or overly formal sense unless expressly so defined herein.

An electronic device as used herein may be a device including, but not limited to, an antenna capable of performing a communication function in at least one frequency band. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device (e.g., a head-mounted-device (HMD), such as electronic glasses, electronic clothes, an electronic bracelet, an electronic necklace, an electronic appcessory, an electronic tattoo, a smart watch, and the like).

The electronic device may be a smart home appliance having an antenna. For example, the smart home appliance may include at least one of a television (TV), a digital versatile disc (DVD) player, an audio player, a refrigerator, an air conditioner, a cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, or an electronic picture frame.

The electronic device including the antenna may be one of various medical devices (e.g., magnetic resonance angiography (MRA), magnetic resonance imaging (MRI), computed tomography (CT), imaging equipment, an ultrasonic instrument, and the like), a navigation device, a global positioning system (GPS) receiver, an event data recorder (EDR), a flight data recorder (FDR), a car infotainment device, electronic equipment for a ship (e.g., a vessel navigation device, a gyro compass, and the like), avionics, a security device, a car head unit, an industrial or domestic robot, an automatic teller machine (ATM), a point of sales (POS) device, and the like.

The electronic device may be part of at least one of an item of furniture or a building/structure including an antenna. The electronic device may be an electronic board, an electronic signature input device, a projector, or any of various measurement machines (e.g., water supply, electricity, gas, a propagation measurement machine, and the like).

The electronic device may be one or more combinations of the aforementioned various devices. In addition, the electronic device may be a flexible device. Moreover, the electronic device is not limited to the aforementioned devices.

Hereinafter, an electronic device according to various embodiments will be described with reference to the accompanying drawings. The term 'user' used in the various embodiments may refer to a person who uses the electronic device or a device which uses the electronic device (e.g., an artificial intelligence (AI) electronic device).

FIG. 1 illustrates a diagram of a network environment including an electronic device according to an embodiment of the present disclosure.

Referring to FIG. 1, the electronic device 100 includes a bus 110, a processor 120, a memory 130, an input/output interface 150, a display 160, and a communication interface 170. In various embodiments of the present disclosure, the electronic device 100 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a central processing unit (CPU), an application processor (AP), and a communication processor (CP). The processor 120 processes an operation or data on control of and/or communication with another component of the electronic device 100.

The processor 120, which may be connected to the LTE network, determines whether a call is connected over a communication network, such as a CS service network using caller identification information (e.g., a caller phone number) of the CS service network (e.g., the 2G/3G network). For example, the processor 120 receives incoming call information (e.g., a CS notification message or a paging request message) of the CS service network over the LTE network (e.g., CSFB). For example, the processor 120 being connected to the LTE network receives incoming call information (e.g., a paging request message) over the CS service network (e.g., SRLTE).

When receiving the incoming call information (e.g., a CS notification message or a paging request message) of the CS service network over the LTE network, the processor 120 obtains caller identification information from the incoming call information. The processor 120 displays the caller identification information on its display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 determines whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 connects the voice call by connecting to the CS service network. For example, when the caller identification information is included in a second reception control list (e.g., a white list), the processor 120 connects the voice call by connecting to the CS service network.

When receiving the incoming call information (e.g., a paging request message) of the CS service network over the LTE network, the processor 120 sends an incoming call response message (e.g., a paging response message) to the CS service network. The processor 120 suspends the LTE service and receives the caller identification information (e.g., a circuit-switched call (CC) setup message) from the CS service network. The processor 120 determines whether to connect the call by comparing the caller identification information with the reception control list. For example, when the caller identification information is included in the first reception control list (e.g., the blacklist), the processor 120 restricts the voice call connection and resumes the LTE network connection. For example, when the caller identification information is not included in the first reception control list (e.g., the blacklist), the processor 120 connects the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. For example, the memory 130 may be a hard drive, flash storage, or RAM. The memory 130 stores commands or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 100 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources (e.g., the bus 110, the processor 120, the memory 130, etc.) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 100. Furthermore, the input/output interface 150 outputs the instructions or data received from the other element(s) of the electronic device 100 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and receive, for example, a touch, a gesture, proximity, a hovering input, etc., using an electronic pen or the user's body part. The display 160 may display a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication. For example, the wireless communication can conform to a cellular communication protocol including at least one of LTE, LTE-Advanced (LTE-A), CDMA, WCDMA, universal mobile telecommunication system (UMTS), WiBro, or GSM.

The wired communication can include at least one of universal serial bus (USB), high definition multimedia interface (HDMI), recommended standard 232 (RS-232), or plain old telephone service (POTS).

The network 162 can include at least one of telecommunications networks, for example, a computer network (e.g., Local Area Network (LAN) or Wide Area Network (WAN)), Internet, and a telephone network.

The electronic device 100 provides the LTE service in the single radio environment by use of at least one module functionally or physically separated from the processor 120. Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Each of the first and second external electronic devices 102 and 104 may be a type of device that is the same as or different from the electronic device 101. According to one embodiment, the server 106 may include a group of one or more servers. According to various embodiments, all or some of the operations to be executed by the electronic device 101 may be executed by another electronic device or a plurality of other electronic devices (e.g., the electronic devices 102 and 104 or the server 106). According to one embodiment, in the case where the electronic device 101 performs a certain function or service automatically or by request, the electronic device 101 may request some functions that are associated therewith from the other electronic devices (e.g., the electronic devices 102 and 104 or the server 106) instead of or in addition to executing the function or service by itself. The other electronic devices (e.g., the electronic devices 102 and 104 or the server 106) may execute the requested functions or additional functions, and may transmit the results to the electronic device 101. The electronic device 101 may provide the requested functions or services by processing the received results as the requested functions or services are or additionally. For this purpose, for example, a cloud computing technique, a distributed computing technique, or a client-server computing technique may be used.

Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Figure 2:
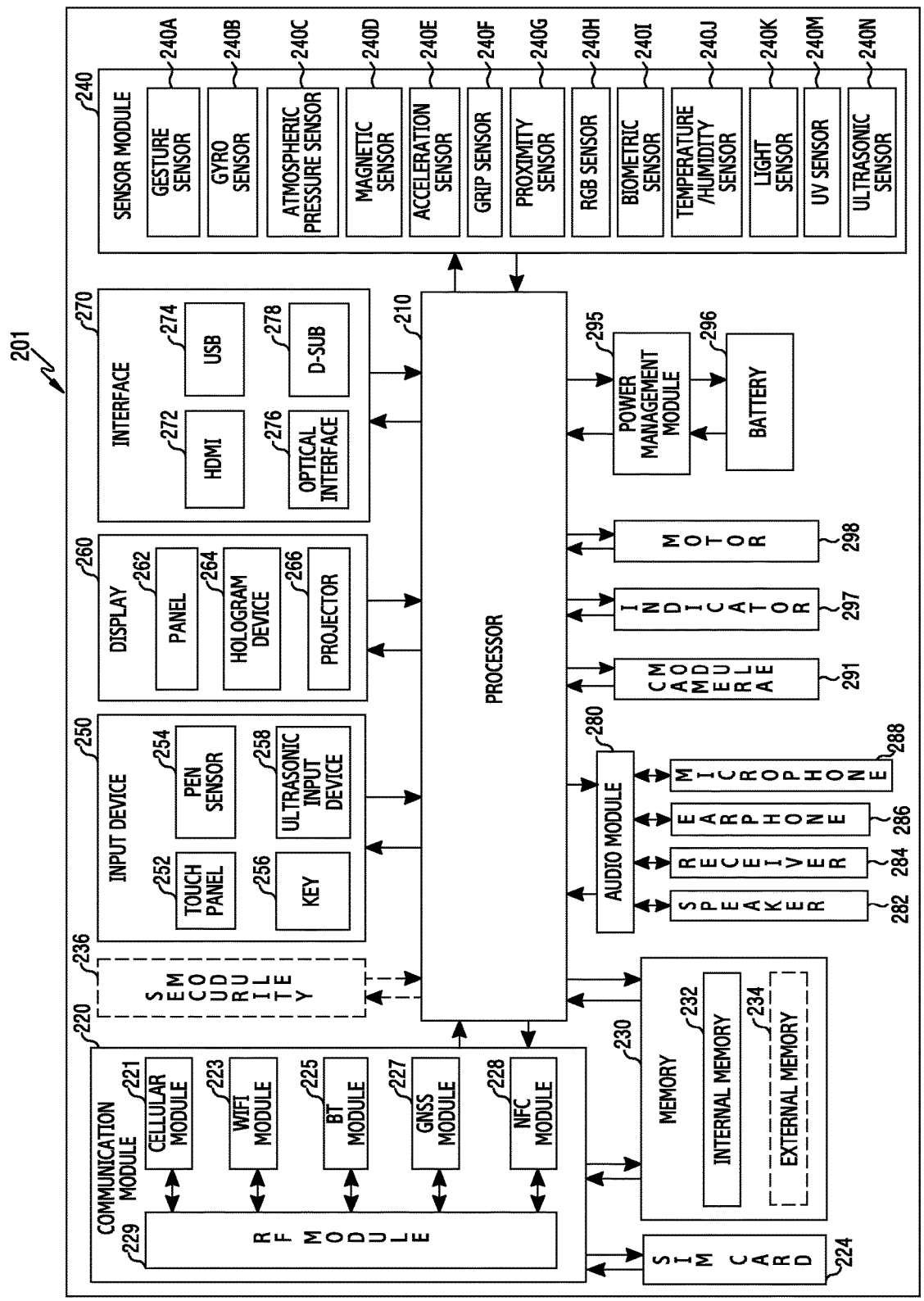
FIG. 2 illustrates a block diagram of an electronic device according to various embodiments of the present disclosure.

FIG. 2 illustrates a diagram of a configuration of an electronic device 201 according to an embodiment of the present disclosure.

Referring to FIG. 2, a configuration of the electronic device 201 is provided. The electronic device 201 may include all or some of the components described with reference to the electronic device 101 of FIG. 1. The electronic device 201 includes at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an operating system (OS) or an application program. The AP 210 processes a variety of data, including multimedia data, and performs arithmetic operations. The AP 210 may be implemented, for example, with a system on chip (SoC). The AP 210 may further include a graphical processing unit (GPU) or other co-processors.

The communication module 220 performs data transmission/reception in communication between the external electronic device 104 and/or the server 106 which may be connected with the electronic device 201 through the network 162. The communication module 220 includes a cellular module 221, a Wi-Fi module 223, a BT module 225, a global navigation satellite system (GNSS) or GPS module 227, a NFC module 228, and a radio frequency (RF) module 229.

The cellular module 221 provides a voice call, a video call, a text service, an internet service, and the like, through a communication network (e.g., LTE, LTE-A, CDMA, WCDMA, UMTS, WiBro, and GSM, and the like). In addition, the cellular module 221 identifies and authenticates the electronic device 201 within the communication network by using the SIM card 224. The cellular module 221 may perform at least some of functions that can be provided by the AP 210. For example, the cellular module 221 may perform at least some of multimedia control functions.

The cellular module 221 includes a communication processor (CP). Further, the cellular module 221 may be implemented, for example, with an SoC. Although elements, such as the cellular module 221 (e.g., the CP), the memory 230, and the power management module 295 are illustrated as separate elements with respect to the AP 210 in FIG. 2, the AP 210 may also be implemented such that at least one part (e.g., the cellular module 221) of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least some (e.g., two or more) of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228 (e.g., a communication processor corresponding to the cellular module 221 and a Wi-Fi processor corresponding to the Wi-Fi module 223) may be implemented with an SoC.

The RF module 229 transmits/receives data, for example an RF signal. The RF module 229 may include, for example, a transceiver, a power amp module (PAM), a frequency filter, a low noise amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the Wi-Fi module 223, the BT module 225, the GNSS module 227, and the NFC module 228 share one RF module 229, at least one of the cellular module 221, the Wi-Fi module 223, the BT module 225, the GNSS module 227, or the NFC module 228 may transmit/receive an RF signal via a separate RF module.

The SIM card 224 may be inserted into a slot formed at a specific location of the electronic device 201. The SIM card 224 includes unique identification information (e.g., an integrated circuit card identifier (ICCID)) or subscriber information (e.g., an international mobile subscriber identity (IMSI)).

The memory 230 includes an internal memory 232 or an external memory 234 and may be volatile or non-volatile memory.

The internal memory 232 may include, for example, at least one of a volatile memory (e.g., a dynamic random access memory (DRAM), a static RAM (SRAM), a synchronous dynamic RAM (SDRAM), and the like) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The internal memory 232 may be a solid state drive (SSD).

The external memory 234 may include a flash drive, and may further include, for example, compact flash (CF), secure digital (SD), micro-SD, mini-SD, extreme digital (xD), memory stick, and the like. The external memory 234 may be operatively coupled to the electronic device 201 via various interfaces.

The electronic device 201 may further include a storage unit (or a storage medium), such as a hard drive, solid state drive, or flash storage.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination/illuminance sensor 240K, an ultraviolet (UV) sensor 240M or ultrasonic sensor 240N.

The ultrasonic sensor 240N may include at least one ultrasonic transducer. The ultrasonic sensor 240N may include a contact type ultrasonic transducer (for example, an enclosed type ultrasonic transducer) and a non-contact type ultrasonic transducer (for example, a resonant type ultrasonic transducer), each of which are described in greater detail below. The contact type ultrasonic transducer and the non-contact type ultrasonic transducer may be controlled to be exclusively or simultaneously operated under a control of the processors 120.

Additionally or alternatively, the sensor module 240 may include, for example, an E-node sensor, an electromyography (EMG) sensor, an electroencephalogram (EEG) sensor, an electrocardiogram (ECG) sensor, a fingerprint sensor, and the like.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes a touch input, for example, by using at least one of an electrostatic type configuration, a pressure-sensitive type configuration, or an ultrasonic type configuration. The touch panel 252 may further include a control circuit. In the instance where the touch panel is of the electrostatic type, not only is physical contact recognition possible, but proximity recognition is also possible. The touch panel 252 may further include a tactile layer, which provides the user with a tactile reaction.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves generated by an input tool through the microphone 288, and may confirm data corresponding to the detected ultrasonic waves.

The (digital) pen sensor 254 may be implemented, for example, by using the same or similar method of receiving a touch input of the user or by using an additional sheet for recognition.

The key 256 may be, for example, a physical button, an optical key, a keypad, or a touch key.

The ultrasonic input unit 258 is a device by which the electronic device 201 detects a reflected sound wave through a microphone 288 and is capable of radio recognition. For example, an ultrasonic signal, which may be generated by using a pen, may be reflected off an object and detected by the microphone 288.

The electronic device 201 may use the communication module 220 to receive a user input from an external device (e.g., a computer or a server) connected thereto.

The display 260 includes a panel 262, a hologram 264, or a projector 266.

The panel 262 may be, for example, a liquid-crystal display (LCD), an active-matrix organic light-emitting diode (AM-OLED), and the like. The panel 262 may be implemented, for example, in a flexible, transparent, or wearable manner. The panel 262 may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 includes, for example, an HDMI 272, a USB 274, an optical communication interface 276, or a D-subminiature (D-sub) 278. The interface 270 may be included, for example, in the communication interface 160 of FIG. 1. Additionally or alternatively, the interface 270 may include, for example, mobile high-definition link (MHL), SD/multi-media card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, the microphone 288, and the like.

The speaker 282 may output a signal of an audible frequency band and a signal of an ultrasonic frequency band. Reflected waves of an ultrasonic signal emitted from the speaker 282 may be received, or a signal of an external audible frequency band may also be received.

The camera module 291 is a device for image and video capturing, and may include one or more image sensors (e.g., a front sensor or a rear sensor), a lens, an image signal processor (ISP), or a flash (e.g., an LED or a xenon lamp). In certain instances, it may prove advantageous to include two or more camera module.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC charges a battery, and prevents an over-voltage or over-current flow from a charger. The charger IC includes a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge measures, for example, a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, for example, a booting state, a message state, a charging state, and the like, of the electronic device 201 or a part thereof (e.g., the AP 210).

The motor 298 converts an electric signal into a mechanical vibration. For example, the motor 298 may provide mechanical feedback to the user, such as when the user taps on the display.

The electronic device 201 includes a processing unit (e.g., a GPU) for supporting mobile TV. The processing unit for supporting mobile TV processes media data according to a protocol of, for example, digital multimedia broadcasting (DMB), digital video broadcasting (DVB), media flow, and the like.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

Figure 3:
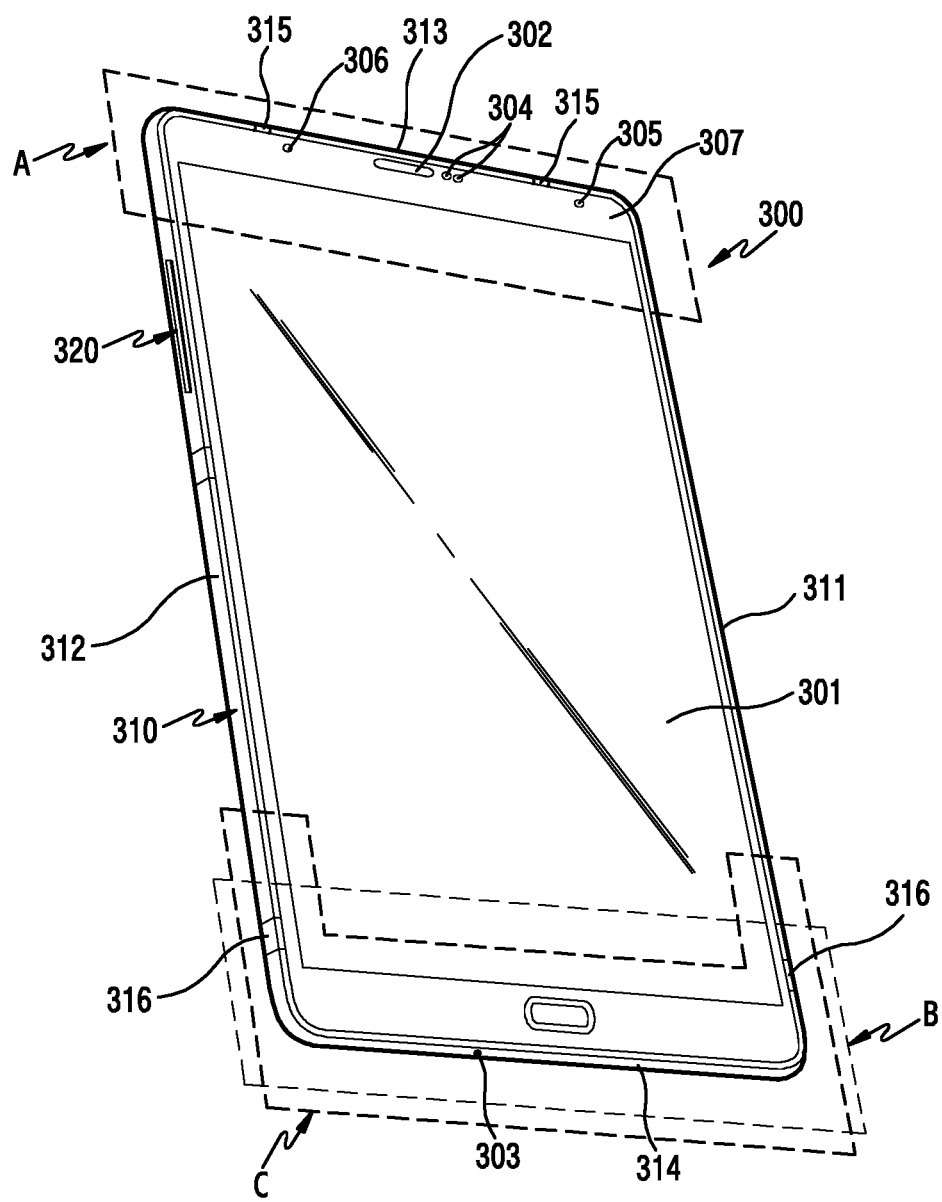
FIG. 3 illustrates a perspective view of an electronic device according to various embodiments of the present disclosure.

At least some parts of a device (e.g., modules or functions thereof) or method (e.g., operations) may be implemented with an instruction stored in a computer-readable storage media for example. The instruction may be executed by the processor 210, to perform a function corresponding to the instruction. The computer-readable storage media may be, for example, the memory 230. At least some parts of the programming module may be implemented (e.g., executed), for example, by the processor 210. At least some parts of the programming module may include modules, programs, routines, a set of instructions, processes, and the like, for performing one or more functions. FIG. 3 illustrates a perspective view of an electronic device 300 according to various embodiments of the present disclosure.

Referring to FIG. 3, a display 301 may be installed on the front 307 of the electronic device 300. A speaker device 302 for outputting, for example, a phone call or music may be installed on the upper side of the display 301. A microphone device 303 for transmitting an electronic device user's voice to the counterpart may be installed on the lower side of the display 301.

According to an embodiment, components for performing various functions of the electronic device 300 may be arranged around the speaker device 302. The components may include at least one sensor module 304. The sensor module 304 may include, for example, at least one of an illuminance sensor (e.g., optical sensor), a proximity sensor, an infrared sensor, or an ultrasonic sensor. According to an embodiment, the components may also include a camera device 305. According to an embodiment, the components may also include an LED indicator 306 for informing the user of the state information of the electronic device 300.

According to various embodiments, the electronic device 300 may include a metal bezel 310 (e.g., may serve as at least a part of a metal housing). According to an embodiment, the metal bezel 310 may be disposed along the outer periphery of the electronic device 300 and may be disposed to extend to at least one area of the back of the electronic device 300, which is connected to the outer periphery. According to an embodiment, the metal bezel 310 may define the thickness of the electronic device along the outer periphery of the electronic device 300 and may be formed in a loop shape. Without being limited thereto, however, the metal bezel 310 may be formed in such a manner that the metal bezel contributes to at least a part of the thickness of the electronic device 300. According to an embodiment, the metal bezel 310 may be disposed only in at least one area of the outer periphery of the electronic device 300. According to an embodiment, the metal bezel 310 may include one or more cut-off portions 315, and a unit bezel part 313 separated by the cut-off portions 315 may be used as an antenna radiator.

According to various embodiments, the metal bezel 310 may have a loop shape along the outer periphery of the electronic device 300 and may be disposed to serve as the entirety or a part of the thickness of the electronic device 300. According to an embodiment, when the electronic device 300 is viewed from the front, the metal bezel 310 may be constituted by a right bezel part 311, a left bezel part 312, the upper bezel part 313, and a lower bezel part 314. Here, the above-described upper bezel part 313 may serve as a unit bezel part that is formed by a pair of cut-off portions 315.

According to various embodiments, an antenna device may be disposed in the upper area (area A) of the electronic device 300. According to an embodiment, the upper bezel part 313 may be used as an main antenna radiator by virtue of the pair of cut-off portions 315. According to an embodiment, the upper bezel part 313 may serve as an antenna radiator that operates in at least two operating frequency bands according to feeding positions. According to an embodiment, the right bezel part 311 or the left bezel part 312 may also be used as the main antenna radiator.

According to various embodiments, an electrical length from a feeding part of the metal bezel, which is used as an antenna radiator, may be adjusted through a ground line of a side key assembly that is disposed on the lateral side of the electronic device. This may be advantageous when the metal bezel is used to implement an antenna radiator having an operating frequency band that has to be grounded to the position in which the side key assembly is installed.

In the exemplary embodiment of the present disclosure, the cut-off portions 315 are formed on the upper portion of the electronic device 300, and the right or left non-segmented bezel part 311 or 312 with respect to the upper bezel part 313 and the cut-off portions 315 is used as an antenna radiator. However, if space is allowed, antenna radiators that have the same configuration as that described above may also be provided in the lower area (area B) of the electronic device.

According to various embodiments, the right bezel part 311 may be used as a multiband antenna radiator that operates in different bands by at least two ground areas that are grounded to different positions on the non-segmented part. Without being limited thereto, however, the left bezel part 312 may also be used as a multiband antenna radiator that operates in different bands by at least two ground areas that are grounded to different positions on the non-segmented part.

According to various embodiments, a form that is used as the main antenna in the area (area C) of the left bezel part 312 and is configured by the ground area (area C) of the right bezel part 311 may be possible. According to an embodiment, the left bezel part, which is a unit bezel part, may serve as an antenna radiator by virtue of another pair of cut-off portions 316.

In the exemplary embodiment of the present disclosure, the cut-off portions 315 are formed on the upper portion of the electronic device 300, and the right or left non-segmented bezel part 311 or 312 with respect to the upper bezel part 313 and the cut-off portions 315 is used as an antenna radiator. However, if space is allowed, antenna radiators that have the same configuration as that described above may also be provided in the lower area (area B) of the electronic device.

Figure 4A:
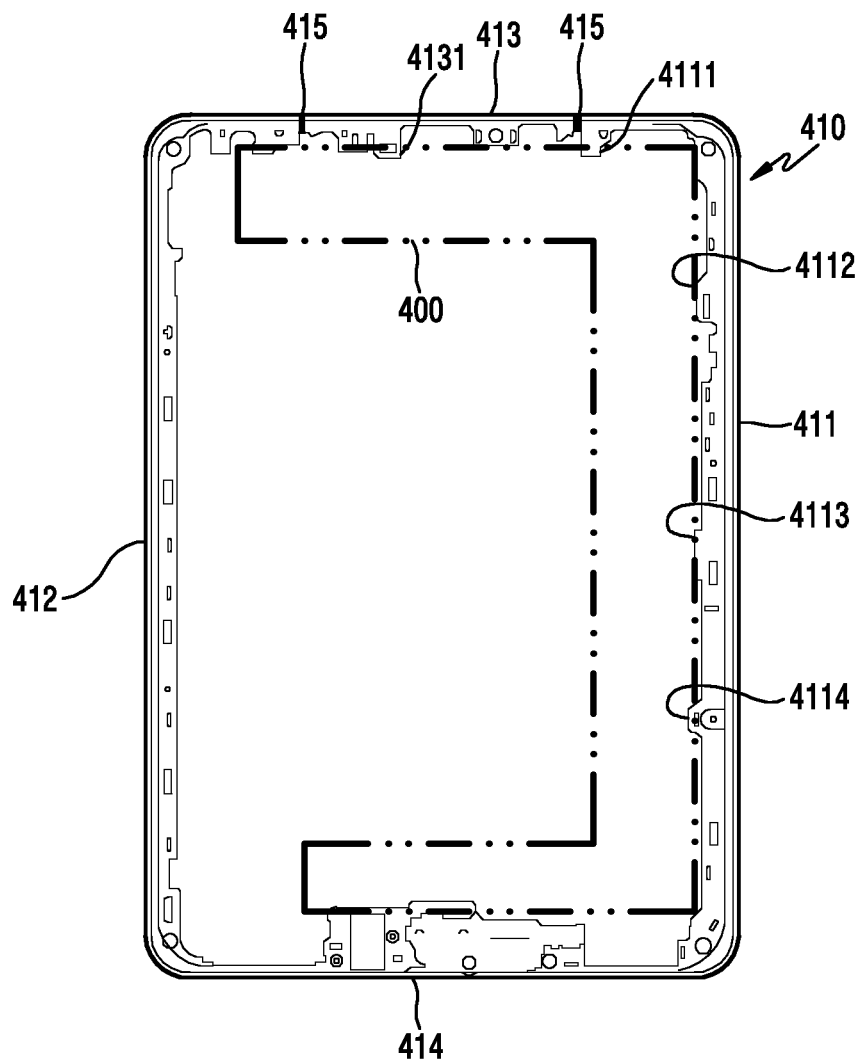
FIG. 4A illustrates a configuration of an antenna device according to various embodiments of the present disclosure.

FIG. 4A illustrates a configuration of an antenna device according to various embodiments of the present disclosure.

According to various embodiments, a metal bezel 410 of FIG. 4A is an illustration of a metal bezel that is similar to, or different from, the metal bezel 310 of FIG. 3.

Referring to FIG. 4A, the metal bezel 410 may include a right bezel part 411, a left bezel part 412, an upper bezel part 413, and a lower bezel part 414, when viewed from the front. According to an embodiment, the upper bezel part 413 may be maintained to be electrically isolated from the right bezel part 411 and the left bezel part 412 by a pair of cut-off portions 415 that are formed with a predetermined interval therebetween. According to an embodiment, the pair of cut-off portions 415 may be formed of a dielectric material. According to an embodiment, the pair of cut-off portions 415 may be formed in such a manner that a synthetic resin is double-injection molded, or insert molded, into the metal bezel 410.

According to various embodiments, a feeding piece 4131 may be integrally formed with the upper bezel part 413 and may be feed-connected to a feeing part of a PCB 400. According to an embodiment, the feeding piece 4131 of the upper bezel part 413 may be feed-connected to the feeding part of the PCB 400 only by installing the PCB 400 in the electronic device, or may be electrically connected to the feeding part by a separate electrical connection member (e.g., a C-clip, etc.).

According to various embodiments, a feeding piece 4111 may protrude inward from the tip end of the right bezel part 411 that is separated by the cut-off portion 415. According to an embodiment, the feeding piece 4111 of the right bezel part 411 may also be feed-connected to the feeding part of the PCB 400.

According to various embodiments, the right bezel part 411 may include a pair of ground pieces 4112 and 4113 that is formed in different positions. According to an embodiment, the pair of ground pieces 4112 and 4113 may be integrally formed with the metal bezel 410 when the metal bezel 410 is formed, and may be grounded to the ground part of the PCB. According to an embodiment, the ground pieces 4112 and 4113 may be electrically connected to the ground part of the PCB only by installing the PCB in the electronic device, or may be electrically connected to the ground part by a separate electrical connection member.

According to various embodiments, the right bezel part 411 may serve as an a multiband antenna radiator that operates in a desired operating frequency band by adjusting the physical length from the feeding piece 4111 to the pair of ground pieces 4112 and 4113. According to an embodiment, the right bezel part 411 may serve as an antenna radiator that operates in a first operating band corresponding to the physical length from the feeding piece to the first ground piece. According to an embodiment, the right bezel part 411 may serve as an antenna radiator that operates in a second operating band corresponding to the physical length from the feeding piece to the second ground piece. According to an embodiment, at least two ground pieces 4112 and 4113 may be disposed in different positions in the same direction from the feeding piece 4111, i.e. the ground pieces 4112 and 4113 are disposed on the same side as the feeding piece 4111. According to an embodiment, the operating frequency band formed as an antenna radiator by the first ground piece 4112 may operate in a frequency band lower than the operating frequency band formed as an antenna radiator by the second ground piece, when the distance between the first ground piece 4112 and the feeding piece 4111 is shorter than the distance between the second ground piece 4113 and the feeding piece 4111.

The above-described feeding piece 4111 and ground pieces 4112 and 4113 may be conductive connection pieces configured separately from the metal bezel 410. According to an embodiment, the above-described electrical connection member may include one or more of various members, such as a thin cable (e.g., metal wire), a flexible printed circuit, a C-clip, a conductive gasket, etc.

According to various embodiments, the right bezel part may further include at least one other ground piece 4114. According to an embodiment, the ground piece 4114 may not be grounded to the PCB, but in a case where additional resonance is required in another band of the antenna radiator, the ground piece 4114 may be electrically connected with the ground part of the PCB by a separate electrical connection member (such as a C-clip, etc.) to implement the additional resonance.

According to various embodiments, an antenna radiator that operates in a desired band may be implemented by adjusting the physical length from a feeding piece to at least one ground piece. For example, as listed in Table 1 below, when the physical length from the feeding piece to the ground piece is 118 mm, GSM850, GSM900, WCDMA5, WCDMA8, LTE5, LTE8, LTE17, LTE20, LTE28, and the like, which operate in a relatively low operating frequency band of 700 MHz to 1 GHz, may be supported. According to an embodiment, when the physical length from the feeding piece to the ground piece is 65 mm, DSC1800, PCS1900, WCDMA1, WCDMA2, WCDMA4, LTE1, LTE2, LTE3, LTE4, LTE7, LTE40, and the like, which operate in a relatively high operating frequency band of 1.7 GHz to 2.8 GHz, may be supported.

TABLE 1

|  | Low Band | High Band |
| --- | --- | --- |
| Support Band | GSM850, GSM900, WCDMA5, WCDMA8, LTE5, LTE8, LTE17, LTE20, LTE28 | DCS1800, PCS1900, WCDMA1, WCDMA2, WCDMA4, LTE1, LTE2, LTE3, LTE4, LTE7, LTE40 |
| Frequency band | 700 MHz~1 GHz | 1.7 GHz~2.8 GHz |
| Metal Length Value | 118 mm | 65 mm |

Figure 4B:
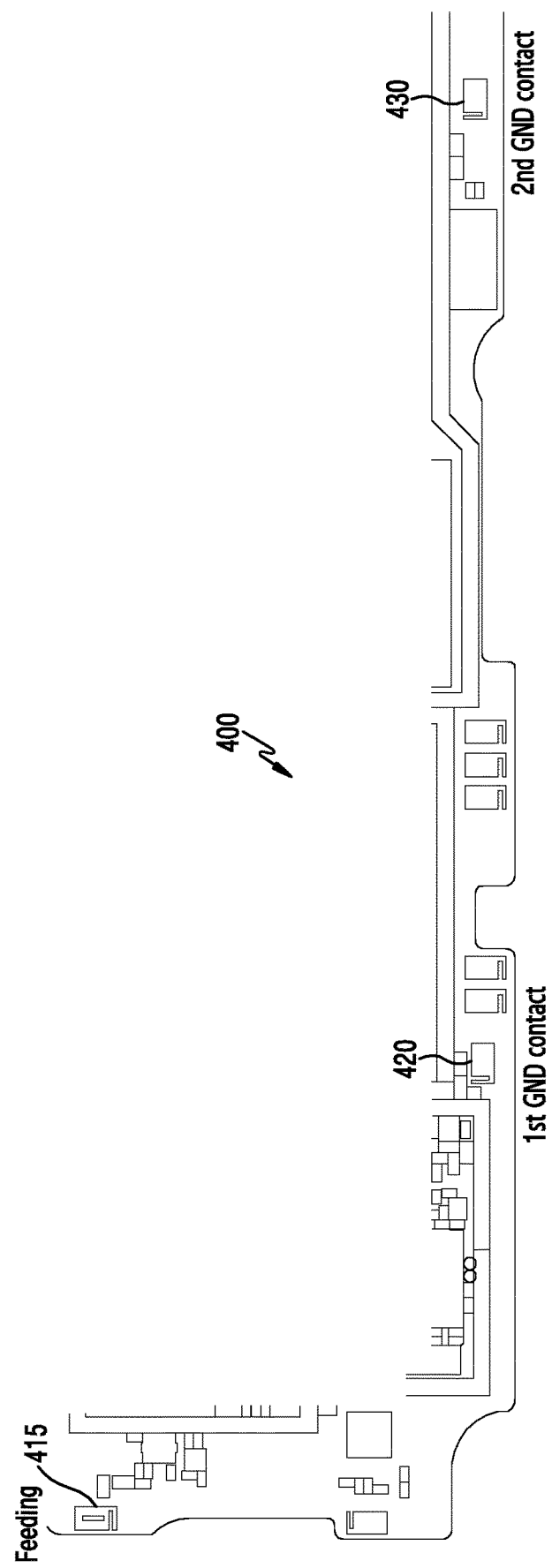
FIG. 4B illustrates a configuration of a printed circuit board (PCB) according to various embodiments of the present disclosure.

FIG. 4B illustrates the configuration of the PCB 400 according to various embodiments of the present disclosure.

Referring to FIG. 4B, the feeding piece (4111 of FIG. 4A) and the ground pieces (4112 and 4113 of FIG. 4A) of the right bezel part (411 of FIG. 4A) may be electrically connected to the PCB 400 and may be grounded to the ground part of the PCB only by mounting the PCB 400 in the housing that includes the metal bezel. According to an embodiment, the PCB 400 may include a feeding pad 410 and ground pads 420 and 430 that are formed to be exposed in the positions that correspond to the feeding piece (4111 of FIG. 4A) and the ground pieces (4112 and 4113 of FIG. 4A) of the right bezel part (411 of FIG. 4A). According to an embodiment, the feeding pad 410 may be electrically connected to the feeding part of the PCB 400 by a pattern. According to an embodiment, the ground pads 420 and 430 may also be electrically connected to the feeding part of the PCB 400 by a pattern. Without being limited thereto, however, the feeding pad 410 and the ground pads 420 and 430 may be electrically connected to the feeding part and the ground parts of the PCB by a thin cable (e.g., metal wire) or a separate electrical connection member.

According to various embodiments, in order to form an antenna radiator, the feeding piece (4111 of FIG. 4a) and the ground pieces (4112 and 4113 of FIG. 4A) are formed on the right bezel part (411 of FIG. 4A) of the metal bezel (410 of FIG. 4A) and are electrically connected to the feeding pad 410 and the ground pads 420 and 430 of the PCB, respectively, but the present disclosure is not limited thereto. For example, the electrical connection structure for forming an antenna radiator may be formed in various areas, such as the left bezel part (412 of FIG. 4A) of the metal bezel (410 of FIG. 4A). Further, the cut-off portions may also be formed in various positions to configure various segment forms of various metal bezels.

Figure 5A:
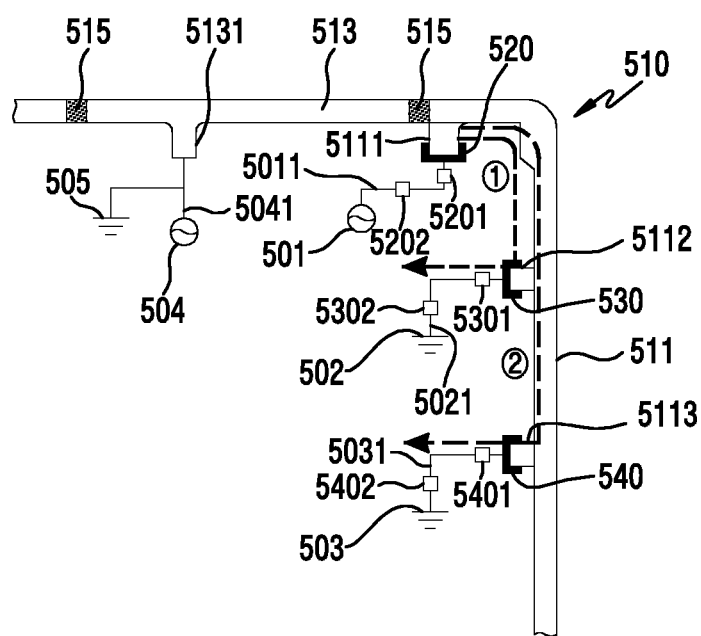
FIG. 5A illustrates a radiation flow of an antenna device according to various embodiments of the present disclosure.
Figure 5B:
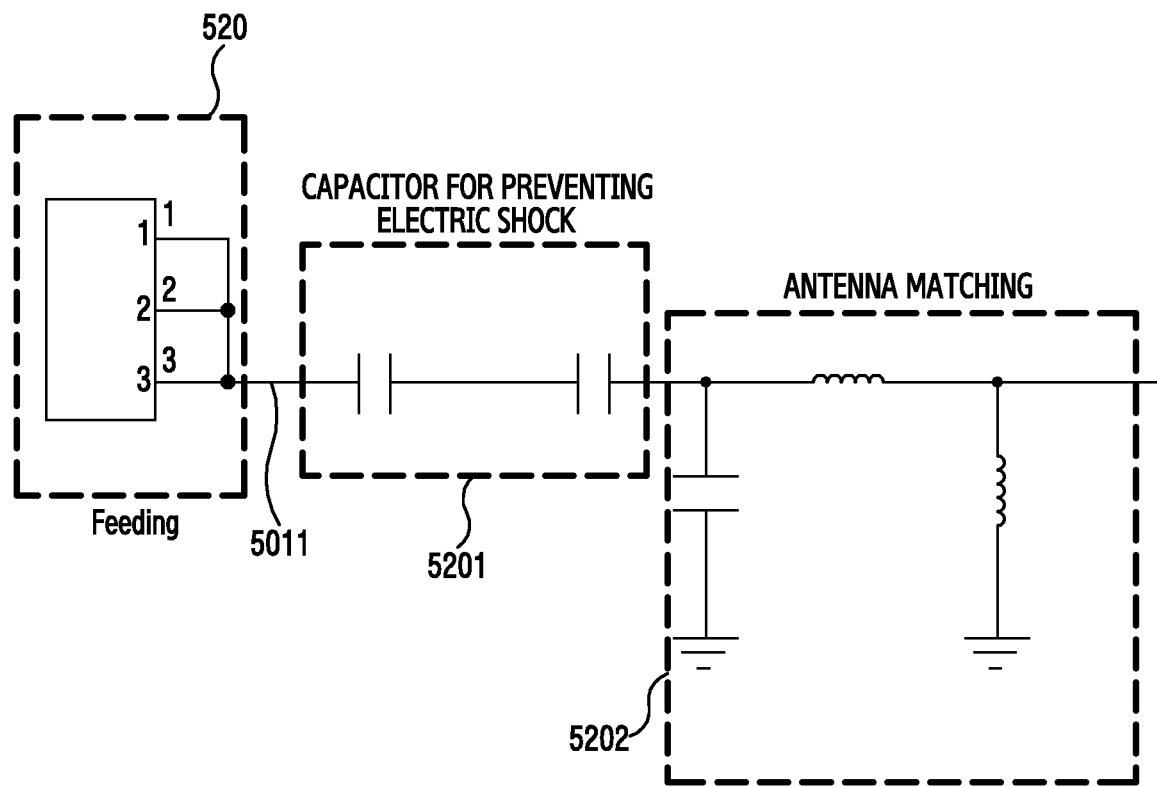
FIGS. 5B and 5C illustrate equivalent circuit diagrams of an electric-shock prevention circuit and a matching circuit according to various embodiments of the present disclosure.
Figure 5C:
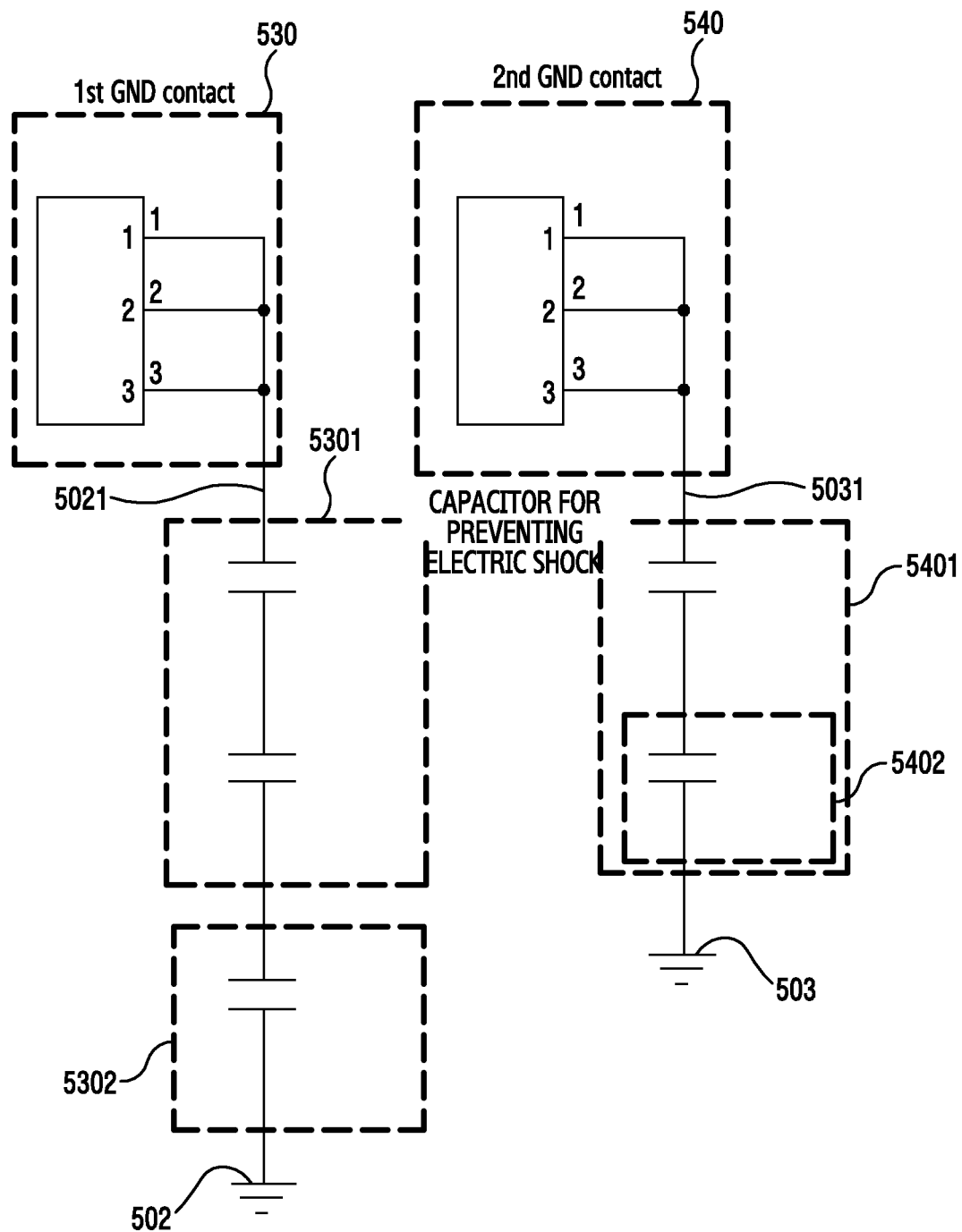

FIG. 5A illustrates a radiation flow of an antenna device according to various embodiments of the present disclosure. FIGS. 5B and 5C are equivalent circuit diagrams illustrating an electric-shock prevention circuit and a matching circuit according to various embodiments of the present disclosure.

According to various embodiments, a metal bezel 510 of FIG. 5A is an illustration of a metal bezel that is similar to, or different from, the metal bezel 410 of FIG. 4A.

Referring to FIG. 5A, an upper bezel part 513, which is separated as a unit bezel by a pair of cut-off portions 515, may be electrically feed-connected to a feeding part 504 of a PCB by a feeding piece 5131. According to an embodiment, a feeding line 5041 may split so as to be grounded to a ground part 505 of the PCB. According to an embodiment, the upper bezel part 513 may be used as the main antenna radiator of the electronic device.

According to various embodiments, a feeding piece 5111 formed on the tip end of a right bezel part 511 (in the position closest to the cut-off portion) may be electrically connected to a feeding pad 520 of the PCB. According to an embodiment, the feeding pad 520 may be electrically connected to a feeding part 501 of the PCB. According to an embodiment, a first ground piece 5112 formed in a position that is spaced a predetermined distance apart from the feeding piece 5111 may be electrically connected to a first ground pad 530 of the PCB. According to an embodiment, the first ground pad 530 may be electrically connected to a first ground part 502 of the PCB. According to an embodiment, a second ground piece 5113 formed in a position that is spaced a predetermined distance apart from the feeding piece 5111 may be electrically connected to a second ground pad 540 of the PCB. According to an embodiment, the second ground pad 540 may be electrically connected to a second ground part 503 of the PCB. In this case, the two ground pieces 5112 and 5113 may be disposed in different positions in the same direction from the feeding piece 5111, for example, the two ground pieces 5112 and 5113 may be on the same side of the feeding piece 5111, shown in FIG. 5A as being to the right of the feeding piece 5111. According to an embodiment, the first ground piece 5112 may be disposed closer to the feeding piece 5111 than the second ground piece 5113.

Accordingly, the antenna radiator formed by the right bezel part 511 may include a first loop-type radiation area (area ① of FIG. 5A) in which the feeding part 501 of the PCB is electrically connected to the feeding piece 5111 and is grounded to the first ground part 502 of the PCB through the first ground piece 5112 of the right bezel part 511. Further, the antenna radiator formed by the right bezel part 511 may include a second loop-type radiation area (area ② of FIG. 5A) in which the feeding part 501 of the PCB is electrically connected to the feeding piece 5111 and is grounded to the second ground part 503 of the PCB through the second ground piece 5113 of the right bezel part 511.

According to various embodiments, the antenna device may further include electric-shock prevention circuits 5201, 5301, and 5401 for preventing an electric shock and discharging static electricity, for example, electro-static discharge (ESD) and matching circuits 5202, 5302, and 5402 for tuning the antenna radiator to a desired frequency band since the feeding pad 520 and the ground pads 530 and 540 of the PCB make direct physical contact with the metal bezel 510 that forms the exterior of the electronic device. According to an embodiment, as illustrated in FIGS. 5B and 5C, the electric-shock prevention circuit 5201 and the matching circuit 5202 may be further provided on a line (pattern) 5011 between the feeding pad 520 and the feeding part 501 of the PCB. According to an embodiment, the electric-shock prevention circuits 5301 and 5401 and the matching circuits 5302 and 5402 may be further provided on corresponding lines (patterns) 5021 and 5031 between the ground pads 530 and 540 and the corresponding ground parts 502 and 503 of the PCB.

Although not illustrated, an electric-shock prevention circuit and a matching circuit may also be included on the line 5041 that is electrically connected to the upper bezel part 513, which is used as the main antenna radiator of the electronic device, and the feeding part 504 of the PCB.

Figure 6A:
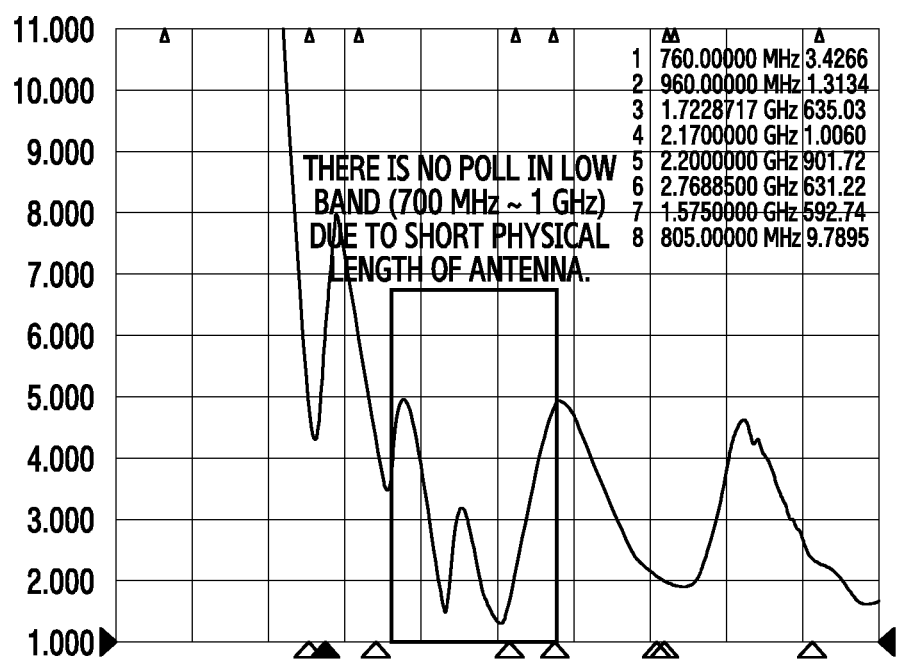
FIGS. 6A to 6C illustrate graphs of a voltage standing wave ratio (VSWR) by an antenna device that operates in individual operating bands according to various embodiments of the present disclosure.
Figure 6B:
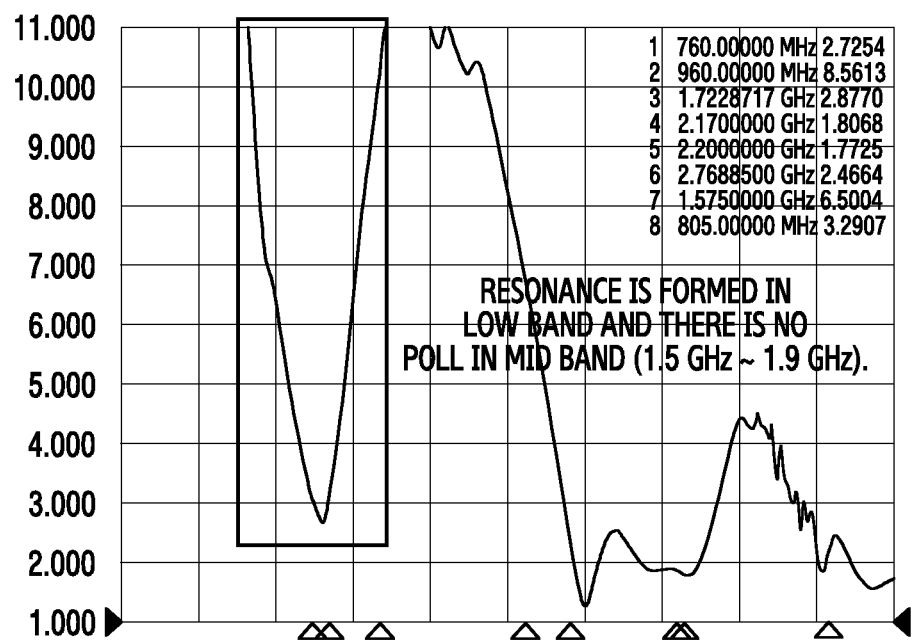
Figure 6C:
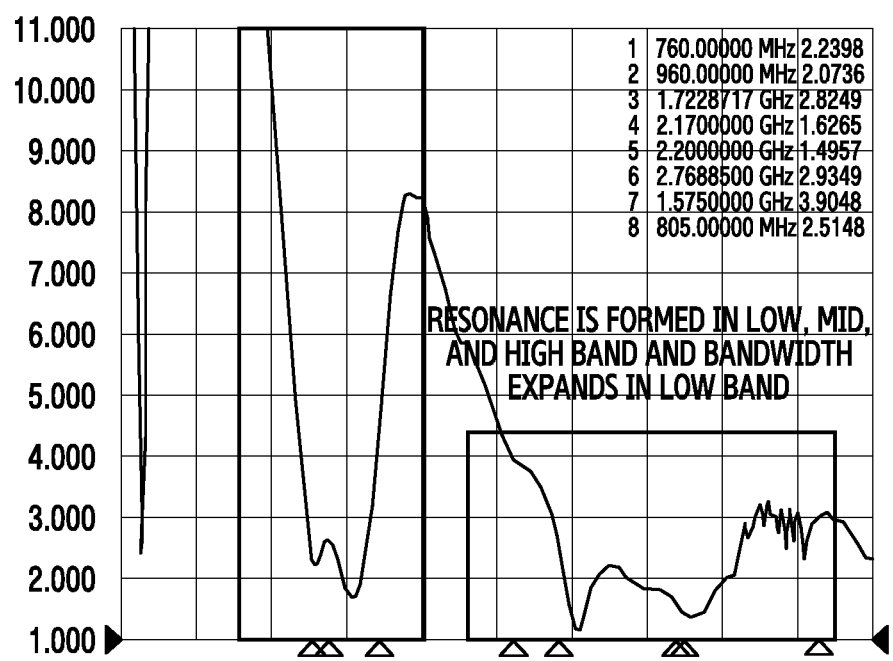

FIGS. 6A to 6C are graphs illustrating a VSWR by the antenna device of FIG. 4A that operates in individual operating bands, according to various embodiments of the present disclosure.

FIG. 6A illustrates an operating frequency band that is secured through a first loop-type antenna radiation area, i.e. area ① of FIG. 5A. In this case, it may be identified that there is no poll due to the short physical length of the antenna. For example, it may be identified that there is no poll in a low band of 700 MHz to 1 GHz.

FIG. 6B illustrates an operating frequency band that is secured through a second loop-type antenna radiation area, i.e. area ② of FIG. 5A. In this case, it may be identified that the resonance is formed in a low band and there is no poll. For example, it may be identified that there is no poll in a mid-band of 1.5 GHz to 1.9 GHz.

FIG. 6C illustrates an operating frequency band that is simultaneously secured through the first loop-type antenna radiation area and the second loop-type antenna radiation area. In this case, it may be identified that the resonance is formed in a low band, in a mid-band, and in a high band, and it can be seen that the bandwidth expands in the low band.

Figure 7:
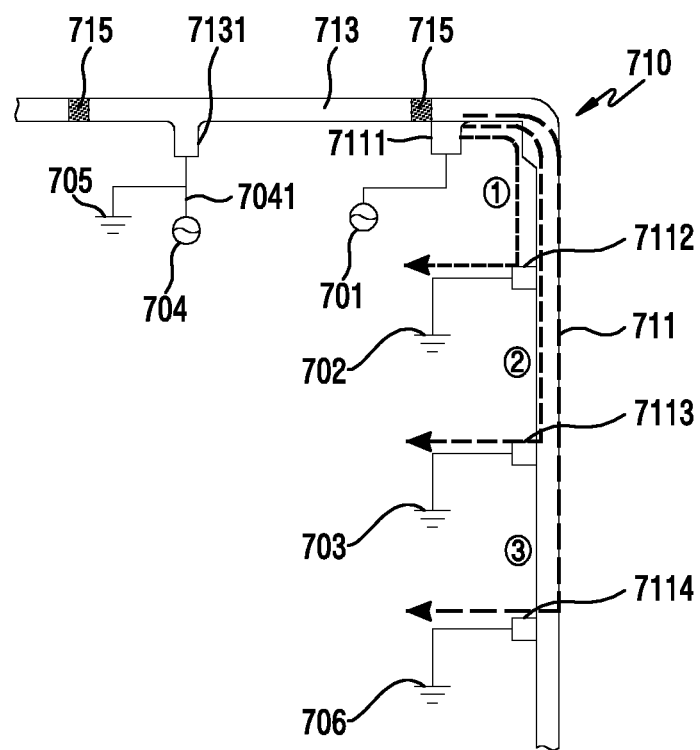
FIG. 7 illustrates a configuration of an antenna device according to various embodiments of the present disclosure.

FIG. 7 illustrates a configuration of an antenna device according to various embodiments of the present disclosure.

Referring to FIG. 7, a multiband antenna is illustrated in which three ground pieces 7112, 7113, and 7114 are formed in different positions in the same direction from a feeding piece 7111 of a right bezel part 711, for example, the three ground pieces or connectors 7112, 7113, and 7114 may be on the same side of the feeding piece 7111.

In the description of FIG. 7, a detailed description of an upper bezel part 713 will be omitted, which includes a feeding piece 7131 and is feed-connected to a feeding part 704 of a PCB and grounded to a ground part 705 of the PCB through a line that branches off from a feeding line 7041.

According to various embodiments, the feeding piece 7111 formed on the tip end of the right bezel part 711 (in the position closest to a cut-off portion) may be electrically feed-connected to a feeding part 701 of the PCB. According to an embodiment, the first ground piece 7112 formed in a position that is spaced a predetermined distance apart from the feeding piece 7111 may be electrically connected to a first ground part 702 of the PCB. According to an embodiment, the second ground piece 7113 formed in a position that is spaced a predetermined distance apart from the feeding piece 7111 may be electrically connected to a second ground part 703 of the PCB. According to an embodiment, the third ground piece 7114 formed in a position that is spaced a predetermined distance apart from the feeding piece 7111 may be electrically connected to a third ground part 706 of the PCB. In this case, the three ground pieces 7112, 7113, and 7114 may be disposed in different positions in the same direction from the feeding piece 7111. According to an embodiment, the first ground piece 7112 may be disposed closer to the feeding piece 7111 than the second ground piece 7113. According to an embodiment, the second ground piece 7113 may be disposed closer to the feeding piece 7111 than the third ground piece 7114.

Accordingly, the antenna radiator formed by the right bezel part 711 may include a first loop-type radiation area (area ① of FIG. 7) in which the feeding part 701 of the PCB is electrically connected to the feeding piece 7111 and is grounded to the first ground part 702 of the PCB through the first ground piece 702 of the right bezel part 711. Further, the antenna radiator formed by the right bezel part 711 may include a second loop-type radiation area (area ② of FIG. 7) in which the feeding part 701 of the PCB is electrically connected to the feeding piece 7111 and is grounded to the second ground part 703 of the PCB through the second ground piece 7113 of the right bezel part 711. In addition, the antenna radiator formed by the right bezel part 711 may include a third loop-type radiation area (area ③ of FIG. 7) in which the feeding part 701 of the PCB is electrically connected to the feeding piece 7111 and is grounded to the third ground part 706 of the PCB through the third ground piece 7114 of the right bezel part 711.

According to various embodiments, the non-segmented right bezel part 711 may serve as a multiband antenna radiator in which multiple resonances are formed in different frequency bands by the electrical lengths of the first, second, and third ground pieces 7112, 7113, and 7114 that are disposed in the different positions in the same direction from the feeding piece 7111.

Although not illustrated, it is apparent that electric-shock prevention circuits and frequency adjustment matching circuits, similar to those illustrated in FIG. 5A, may also be provided between the feeding pieces 7131 and 7111 and the ground pieces 7112, 7113, and 7114, which are electrically connected to the upper bezel part 713 and the right bezel part 711, and the corresponding feeding parts 701 and 704 and ground parts 702, 703, and 704 of the PCB.

Figure 8:
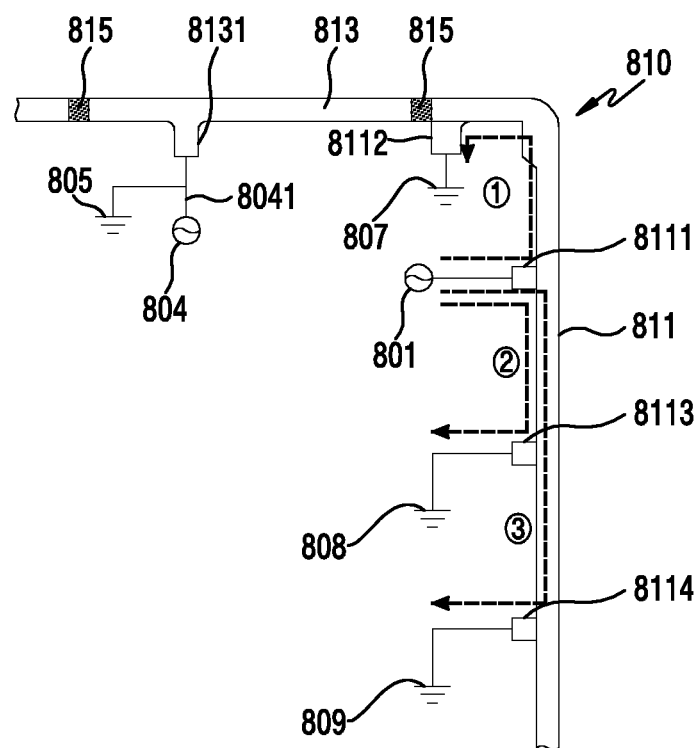
FIG. 8 illustrates a configuration of an antenna device according to various embodiments of the present disclosure.

FIG. 8 illustrates a configuration of an antenna device according to various embodiments of the present disclosure.

Referring to FIG. 8, a multiband antenna is illustrated in which three ground pieces 8112, 8113, and 8114 are formed in different positions in different directions from a feeding piece 8111 of a right bezel part 811, as opposed to those illustrated in FIGS. 4A and 5A. Different direction means that the feeding piece 8111 is disposed in between the ground pieces 8112, 8113, and 8114, as shown in FIG. 8.

According to various embodiments, an upper bezel part 813, which is separated as a unit bezel by a pair of cut-off portions 815, may be electrically feed-connected to a feeding part 804 of a PCB by a feeding piece 8131. According to an embodiment, a feeding line 8041 may split so as to be grounded to a ground part 805 of the PCB. According to an embodiment, the upper bezel part 813 may be used as the main antenna radiator of the electronic device.

According to various embodiments, a feeding piece 8111 may be formed in a suitable place of the non-segmented right bezel part 811. According to an embodiment, the feeding piece 8111 may be disposed in a corresponding position of the right bezel part 811, which is a predetermined distance away from the cut-off portion 815 on the border between the upper bezel part 813 and the right bezel part 811. According to an embodiment, the feeding pad 8111 may be electrically feed-connected to a feeding part 801 of the PCB.

According to various embodiments, the first ground piece 8112 formed in a position that is spaced a predetermined distance apart from the feeding part 801 in a direction toward the cut-off portion 815 may be electrically connected to a first ground part 807 of the PCB. According to an embodiment, the second ground piece 8113 formed in a position that is spaced apart from the first feeding piece 8111 in the direction opposite to that toward the first ground piece 8112 may be electrically connected to a second ground part 808 of the PCB. According to an embodiment, the third ground piece 8114 formed in a position that is spaced a predetermined distance apart from the first feeding piece 8111 in the same direction as that of the second ground piece 8113 may be electrically connected to a third ground part 809 of the PCB. In this case, the operating frequency bands formed by the three ground pieces 8112, 8113, and 8114 may be adjusted to desired frequency bands according to the position of the feeding piece 811.

According to various embodiments, the antenna radiator formed by the right bezel part 811 may include a first loop-type radiation area (area ① of FIG. 8) in which the feeding part 801 of the PCB is electrically connected to the feeding piece 8111 and is grounded to the first ground part 807 of the PCB through the first ground piece 8112 of the right bezel part 811. Further, the antenna radiator formed by the right bezel part 811 may include a second loop-type radiation area (area ② of FIG. 8) in which the feeding part 801 of the PCB is electrically connected to the feeding piece 8111 and is grounded to the second ground part 808 of the PCB through the second ground piece 8113 of the right bezel part 811. In addition, the antenna radiator formed by the right bezel part 811 may include a third loop-type radiation area (area ③ of FIG. 8) in which the feeding part 801 of the PCB is electrically connected to the feeding piece 8111 and is grounded to the third ground part 809 of the PCB through the third ground piece 8114 of the right bezel part 811.

According to various embodiments, the non-segmented right bezel part 811 may serve as a multiband antenna radiator in which multiple resonances are formed in different frequency bands by the electrical lengths of the first, second, and third ground pieces 8112, 8113, and 8114 that are disposed in the different positions in the different directions from the feeding piece 8111.

Although not illustrated, it is apparent that electric-shock prevention circuits and frequency adjustment matching circuits, similar to those illustrated in FIG. 5A, may also be provided between the feeding pieces 8131 and 8111 and the ground pieces 8112, 8113, and 8224, which are electrically connected to the upper bezel part 813 and the right bezel part 811, and the corresponding feeding parts 801 and 804 and ground parts 807, 808, and 809 of the PCB.

Various embodiments may provide an electronic device that includes: an external housing that includes a first surface directed in a first direction, a second surface directed in a second direction opposite to the first direction, and a side surface configured to surround at least a part of the space between the first and second surfaces; a printed circuit board (PCB) disposed within the external housing; a communication circuit disposed on the printed circuit board; a conductive member configured to form a part of the side surface of the external housing; a non-conductive member configured to form another part of the side surface of the external housing and to electrically isolate the conductive member while making contact with the conductive member; and a ground member disposed within the external housing, and the conductive member may include: a first portion located a first distance from the non-conductive member and electrically connected with the communication circuit; a second portion located a second distance, which is larger than the first distance, from the non-conductive member and electrically connected with the ground member; and a third portion located a third distance, which is larger than the second distance, from the non-conductive member and electrically connected with the ground member.

According to various embodiments, the communication circuit may be configured to transmit a first signal having a first frequency band to the outside using a portion between the first and second portions of the conductive member and to transmit a second signal having a second frequency band to the outside using a portion between the first and third portions of the conductive member.

According to various embodiments, the first frequency band may include a frequency higher than the second frequency band.

According to various embodiments, the side surface of the external housing may include a first side and a second side longer than the first side; the conductive member may form at least a part of the first side and at least a part of the second side; and another conductive member disposed to be spaced apart from the conductive member may form at least one other part of the first side.

Various embodiments may provide an electronic device that includes: a metal member configured to have a length that contributes to at least a part of the electronic device; and a printed circuit board (PCB) configured to be feed-connected to a preset position of the metal member in order to apply the metal member as an antenna radiator, and at least two positions of the metal member that differ from the feeding position may be grounded through the PCB.

According to various embodiments, the at least two ground positions may be disposed in different positions in the same direction with respect to the feeding position of the metal member.

According to various embodiments, the metal member may adjust the operating frequency band of the antenna radiator by adjusting the electrical length between the feeding position and the at least two grounded positions.

According to various embodiments, the antenna radiator that has the ground position disposed close to the feeding position may operate in a relatively low frequency band.

According to various embodiments, the at least two ground positions may be disposed in different directions with respect to the feeding position of the metal member.

According to various embodiments, the antenna radiator that has the ground position disposed close to the feeding position may operate in a relatively low frequency band.

According to various embodiments, the metal member may be a metal bezel or a decoration member that is disposed such that at least a part thereof is exposed to the outside of the electronic device.

According to various embodiments, the electronic device may further include a display, and the metal member may be disposed in such a manner that the metal member surrounds at least a part of the outer periphery of the display.

According to various embodiments, the metal member may be formed in a closed-loop type.

According to various embodiments, the electronic device may be a wearable electronic device that is worn on a part of a user's body.

According to various embodiments, the feeding position and at least one ground position of the metal member may be electrically connected to each other by the PCB and an electrical connection member.

According to various embodiments, the electrical connection member may be at least one of a conductive poron tape, a conductive gasket, or a conductive tape.

Various embodiments may provide an electronic device that includes: a metal bezel formed in such a manner that the metal bezel surrounds at least a part of the outer periphery of the electronic device; a printed circuit board (PCB) configured to be feed-connected to a preset position of the metal bezel in order to apply at least a part of the metal bezel as an antenna radiator; and at least two ground parts disposed in different positions in the same direction with respect to the feeding position of the metal bezel, and the ground parts may be grounded through the PCB so that the metal bezel serves as a multiband antenna radiator that operates in different bands.

Figure 9:
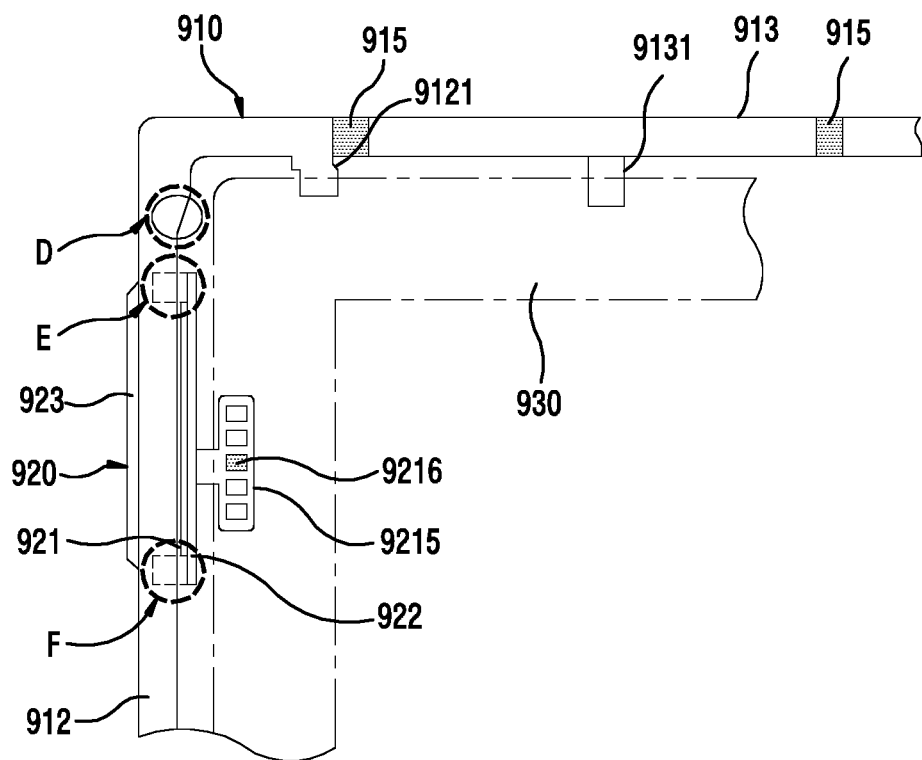
FIG. 9 illustrates a configuration of an antenna device according to various embodiments of the present disclosure.

FIG. 9 illustrates a configuration of an antenna device according to various embodiments of the present disclosure.

Referring to FIG. 9, a metal bezel 910 may include a right bezel part 911, a left bezel part 912, an upper bezel part 913, and a lower bezel part 914, when viewed from the front. According to an embodiment, the upper bezel part 913 may be maintained to be electrically isolated from the right bezel part 911 and the left bezel part 912 by a pair of cut-off portions 915 that are formed with a predetermined interval therebetween. According to an embodiment, the pair of cut-off portions 915 may be formed of a dielectric material. According to an embodiment, the pair of cut-off portions 915 may be formed in such a manner that a synthetic resin is double-injection molded, or insert molded, into the metal bezel 910.

According to various embodiments, a feeding piece 9131 may be integrally formed with the upper bezel part 913 and may be feed-connected to a feeing part of a PCB 900. According to an embodiment, the feeding piece 9131 of the upper bezel part 913 may be feed-connected to the feeding part of the PCB 900 only by installing the PCB 900 in the electronic device, or may be electrically connected to the feeding part by a separate electrical connection member (e.g., a C-clip, etc.).

According to various embodiments, a feeding piece 9121 may protrude inward from the tip end of the left bezel part 912 that is separated by the cut-off portion 915. According to an embodiment, the feeding piece 9121 of the left bezel part 912 may also be feed-connected to the feeding part of the PCB.

According to various embodiments, the left bezel part 912 may be selectively or entirely electrically grounded to the PCB 900 in different positions of a side key assembly 920 that is disposed on the periphery of the left bezel part 912 so that the electrical length by which the left bezel part 912 is grounded to the PCB 900 from the feeding piece 9121 through the left bezel part 912 may be adjusted.

According to various embodiments, the side key assembly 920 may include a key button 923 disposed in such a manner that at least a part thereof is exposed through a side surface of the electronic device or protrudes from the side surface of the electronic device, a metal support plate 922 that supports the key button 923, and a flexible printed circuit board (FPCB) 921 disposed between the key button 923 and the support plate 922. According to an embodiment, a PCB connection part 9215 that includes a ground pad 9216 is extracted toward the inside of the electronic device such that the flexible printed circuit board 921 may be electrically connected to the PCB 900.

According to various embodiments, the metal support plate 922 may be installed to make contact with the left bezel part 912 of the metal bezel 910 so as to be electrically connected thereto, and at least one of area D or area E of the flexible printed circuit board 921 may be exposed to be electrically connected to the corresponding portion of the support plate 922, which enables the metal support plate to be grounded to the PCB 900.

According to various embodiments, when the left bezel part is grounded to the PCB 900 from the feeding piece 9121 through area D of FIG. 9, the electrical length may restrain the left bezel part 912, which operates as an antenna radiator, from implementing a desired operating frequency band. However, when the ground position with the PCB 900 is changed through area E and area F of FIG. 9 via the side key assembly 920 (when the electrical length from the feeding piece through the left bezel part is changed), the left bezel part 912 may implement an antenna radiator that has a desired operating frequency band. According to an embodiment, when the ground position is determined to be area E of the side key assembly 920, the electrical length becomes shorter than when the ground position is determined to be area F so that it is possible to implement a relatively high desired operating frequency band.

The above-described feeding piece 9121 may be a conductive connection piece configured separately from the metal bezel 910.

According to various embodiments, at least one dielectric cut-off portion for separating at least one unit bezel part from the metal bezel may be formed on at least one of the upper, lower, left, or right sides of the metal bezel.

Figure 10:
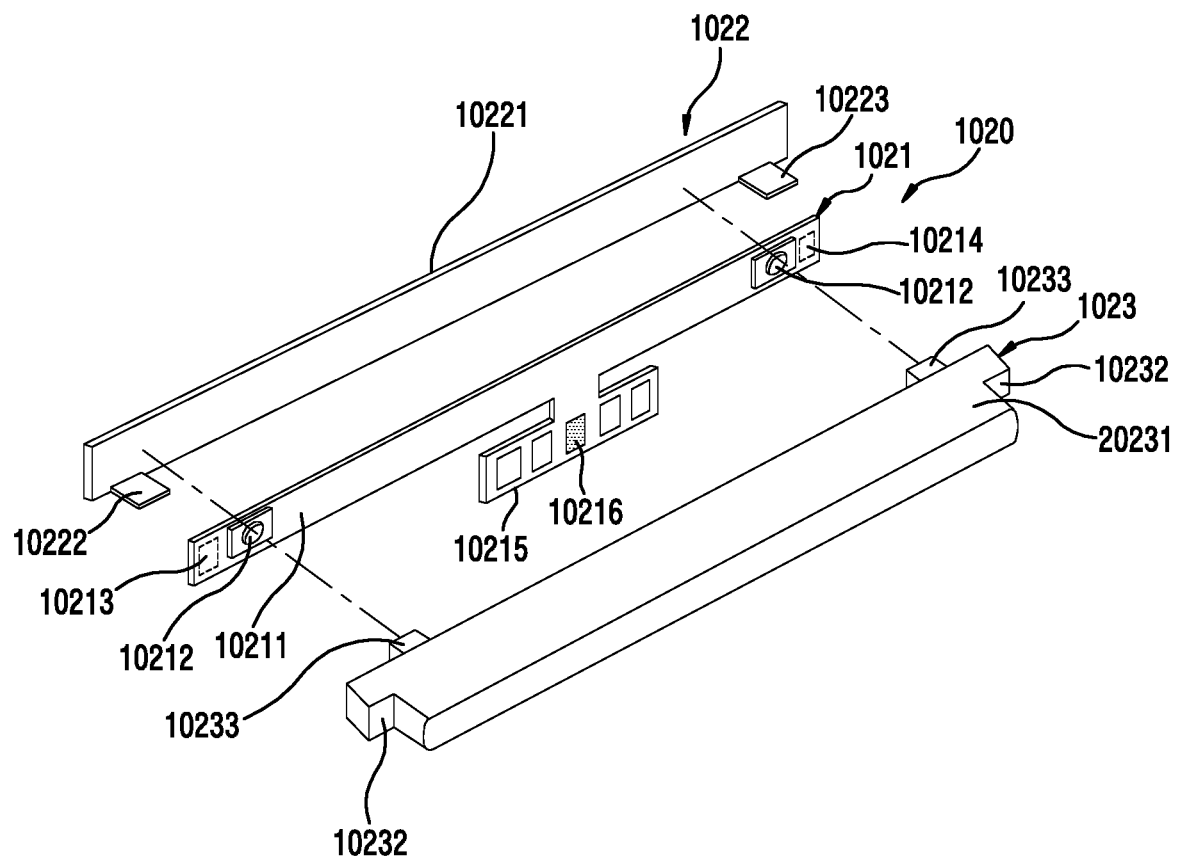
FIG. 10 illustrates an exploded perspective view of a side key assembly according to various embodiments of the present disclosure.

FIG. 10 illustrates an exploded perspective view of a side key assembly 1020 according to various embodiments of the present disclosure.

According to various embodiments, the side key assembly 1020 of FIG. 10 is an illustration of a side key assembly that is similar to, or different from, the side key assembly 920 applied to the metal bezel 910 of FIG. 9.

Referring to FIG. 10, the side key assembly 1020 may be disposed such that at least a part (e.g., a key body) of a key button is exposed through the outside (e.g., lateral side) of the electronic device, to perform a corresponding function (e.g., a volume up/down function, a wake-up/sleep function, a power on/off function, etc.) of the electronic device by a user's pressing operation. The side key assembly 1020 may include a flexible printed circuit board 1021 that includes a pair of dome keys 10212 spaced apart from each other by a predetermined distance, a metal support plate 1022 disposed on one side of the flexible printed circuit board 1021 to support the same, and a key button 1023 disposed on the opposite side of the flexible printed circuit board 1021 to operate the dome keys 10212.

According to various embodiments, the key button 1023 may include: a key body 10231 disposed to be exposed to the outside of the electronic device, or to partially protrude from the electronic device, when installed; stoppers 10232 protruding from the opposite ends of the key body 10231 so as to be supported by the inside of the electronic device; pressing protrusions 10233 protruding toward the inside of the electronic device from the key body 10231 to press the dome keys 10212 of the flexible printed circuit board 1021, which are disposed in the corresponding position. According to an embodiment, the key body 10231 may be formed of a synthetic resin material, a metal material, etc., and the pressing protrusions 10233 may be formed of at least one of rubber, silicone, or urethane.

According to various embodiments, the flexible printed circuit board 1021 may include a circuit body 10211 that has a length and a shape substantially similar to those of the key body 10231 and the dome keys 10212 mounted on the circuit body 10211 so as to be pressed by the pressing protrusions 10233 of the key body 10231. According to an embodiment, a PCB connection part 10215 having a predetermined shape may be extracted from the circuit body 10211 and may be finally electrically connected to the PCB. According to an embodiment, a ground pad 10216 to be grounded to the PCB may be formed on the PCB connection part 10215.

According to various embodiments, the support plate 1022 may include a plate body 10221 for supporting the circuit body 10211 of the flexible printed circuit board 1021 and a first bezel fixing piece 10222 and a second bezel fixing piece 10223 that are formed on the opposite ends of the plate body 10221 so as to be bent and are brought into physical contact with, and fixed to, the left bezel part of the metal bezel. According to an embodiment, the circuit body 10211 of the flexible printed circuit board 1021 may make surface-to-surface contact with the plate body 10221 of the support plate 1022 and may be fixed to the support plate 1022 through bonding, taping, etc.

According to various embodiments, the circuit body 10211 of the flexible printed circuit board 1021 may include a first exposed part 10213 and a second exposed part 10214, the patterns of which are exposed, on the opposite ends thereof. The first exposed part 10213 and the second exposed part 10214 may be electrically connected to the ground pad 10216 of the PCB connection part 10215 through the internal pattern of the flexible printed circuit board 1021. According to an embodiment, the first exposed part 10213 may be electrically connected with the support plate 1022 by physical contact around the first bezel fixing piece 10222 of the plate body 10221. According to an embodiment, the second exposed part 10214 may be electrically connected with the support plate 1022 by physical contact around the second bezel fixing piece 10223 of the plate body 10221. According to an embodiment, the first exposed part 10213 and the second exposed part 10214 may be electrically connected to the first bezel fixing piece 10222 and the second bezel fixing piece 10223, respectively, or may be connected to one of the two bezel fixing pieces.

Figure 11:
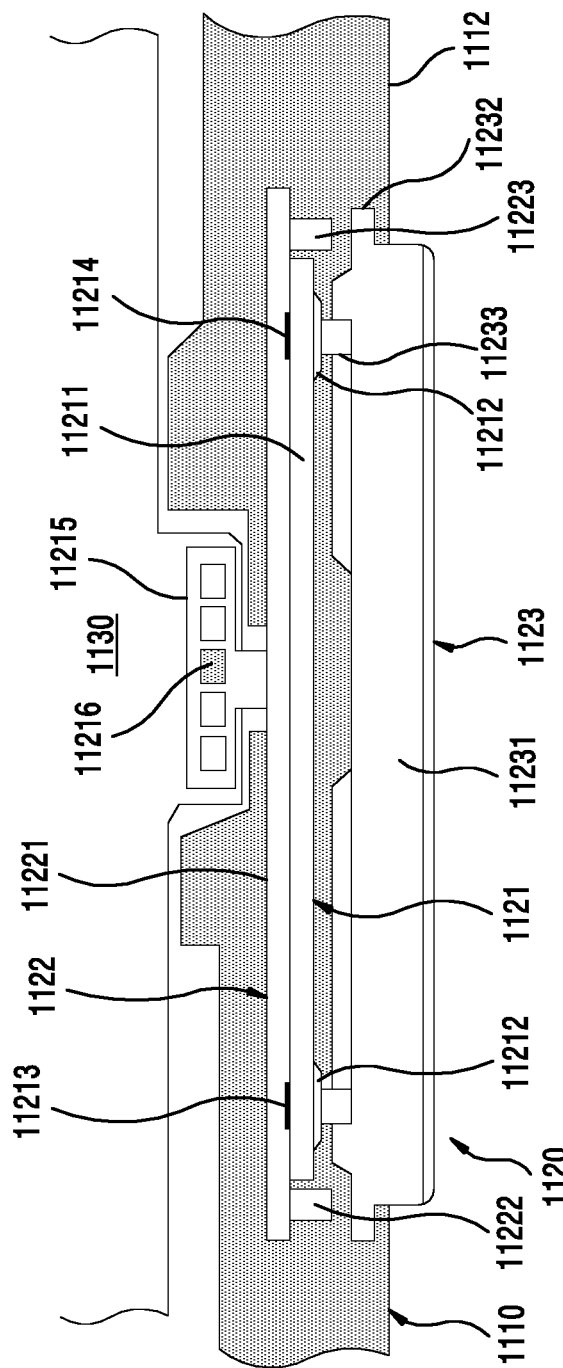
FIG. 11 illustrates a sectional view of major parts of a state in which a side key assembly according to various embodiments of the present disclosure.

FIG. 11 illustrates a sectional view of major parts of a state in which a side key assembly 1120 according to various embodiments of the present disclosure. As shown FIG. 11, the sectional view of major parts of the state is mounted in an electronic device.

According to various embodiments, the side key assembly 1120 of FIG. 11 is an illustration of a side key assembly that is similar to, or different from, the side key assembly 1020 of FIG. 10.

Referring to FIG. 11, first, a key button 1123 of the side key assembly 1120 may be installed in such a manner that a key body 11231 is partially exposed through a left bezel part 1112 of a metal bezel 1110. Next, a support plate 1122 to which a flexible printed circuit board 1121 is attached may be brought into physical contact with, and fixed to, the left bezel part 1112 through first and second bezel fixing pieces 11222 and 11223. Thereafter, a PCB connection part 11215 of the flexible printed circuit board 1121 may be extracted toward a PCB 1130 and may be electrically connected to the PCB. In this case, a ground pad 11216 of the PCB connection part 11215 may also be electrically connected to a ground part of the PCB 1130.

According to an embodiment, when one side or an opposite side of the key body 11231 is pressed toward the inside of the electronic device after the side key assembly 1120 is completely assembled, pressing protrusions 11233 may press dome keys 11212 of the flexible printed circuit board 1121, the dome keys 11212 may be pressed while being supported by the support plate 1122 fixed to the left bezel part 1112, and signals of the dome keys may be transferred to the PCB through the PCB connection part 11215, whereby the electronic device may perform the corresponding function.

According to various embodiments, two ground paths may be implemented from the left bezel part 1112 to the PCB 1130 through the side key assembly 1120. According to an embodiment, the ground paths may include: a first ground path that travels through the support plate 1122 brought into contact with the left bezel part 1112 and reaches the ground part of the PCB 1130 through the ground pad 11216 of the PCB connection part 11215 along a first exposed part 11213 of the flexible printed circuit board 1121; and a second ground path that travels through the support plate 1122 brought into contact with the left bezel part 1112 and reaches the ground part of the PCB 1130 through the ground pad 11216 of the PCB connection part 11215 along a second exposed part 11214 of the flexible printed circuit board 1121. By virtue of the above-described first and/or second ground path, the left bezel part 1112 may be implemented to be an antenna radiator that operates in different frequency bands due to a difference in the physical length from a feeding piece 11121.

Figure 12A:
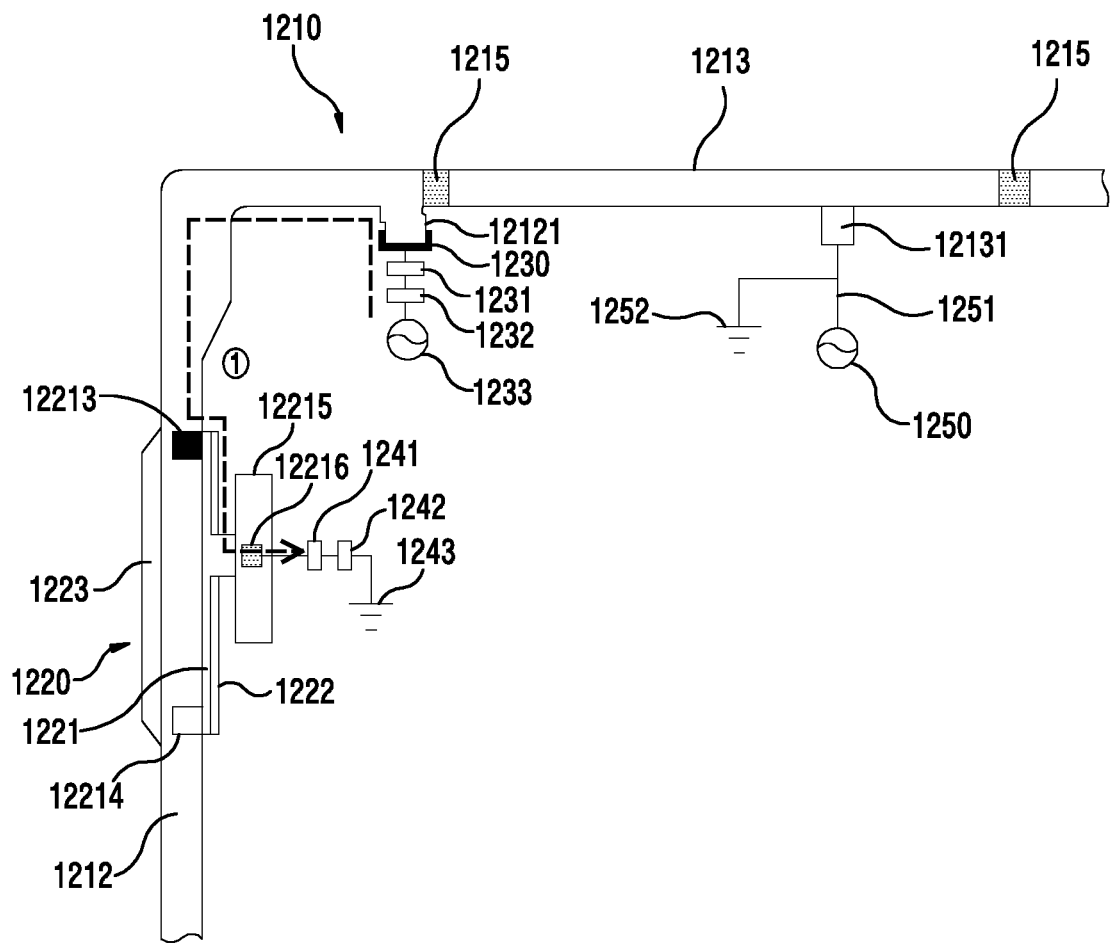
FIGS. 12A and 12B illustrate diagrams of a change in a ground position by a side key assembly according to various embodiments of the present disclosure.
Figure 12B:
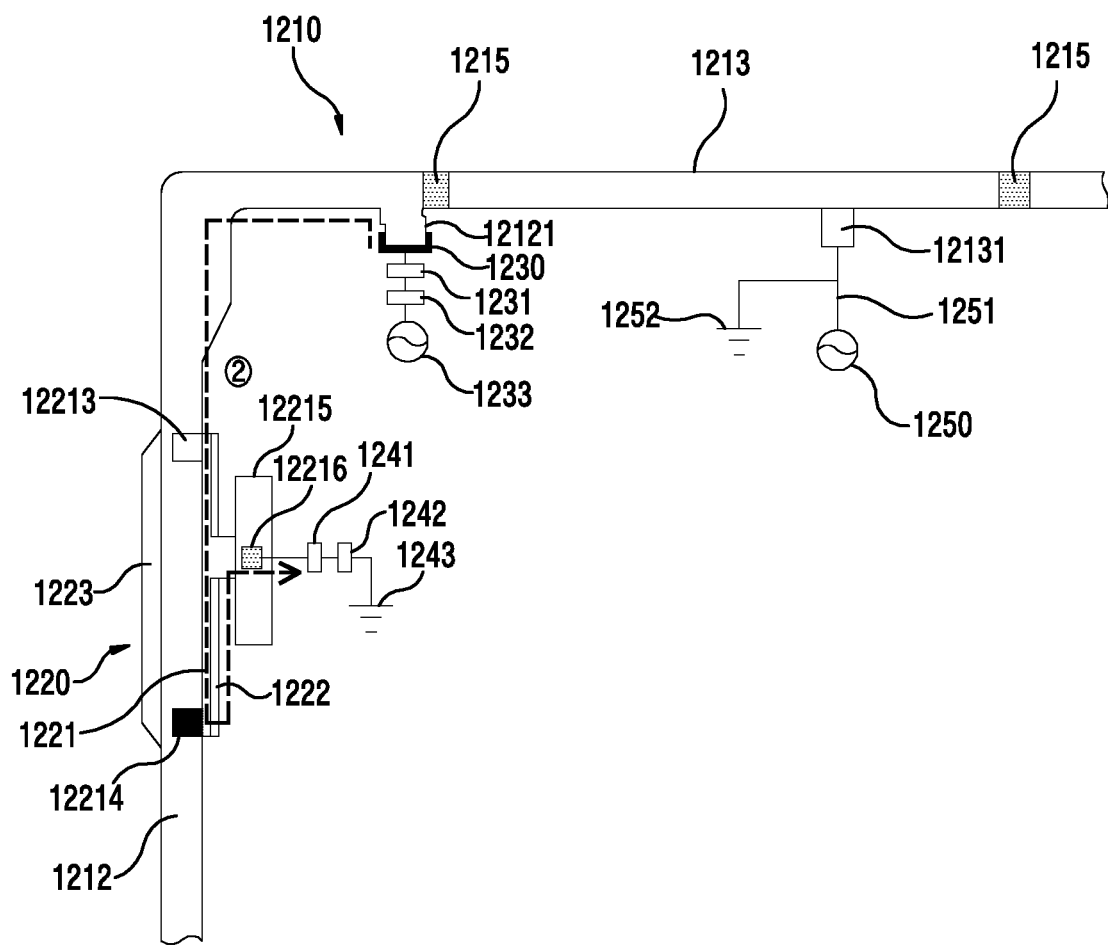

FIGS. 12A and 12B are diagrams illustrating a change in a ground position by a side key assembly according to various embodiments of the present disclosure.

The side key assembly 1220 of FIGS. 12A and 12B is an illustration of a side key assembly that is similar to, or different from, the side key assemblies 920, 1020, and 1120 illustrated in FIGS. 9 to 11, respectively.

In the description of FIGS. 12A and 12B, a detailed description of an upper bezel part 1213 will be omitted, which includes a feeding piece 12131 and is feed-connected to a feeding part 1250 of a PCB and grounded to a ground part 1252 of the PCB through a line that branches off from a feeding line 1251.

Referring to FIG. 12A, a feeding piece 12121 formed on the tip end of a left bezel part 1212 (in the position closest to a cut-off portion) may be electrically connected to a feeding pad 1230 of the PCB. According to an embodiment, the feeding pad 1230 may be electrically connected to a feeding part 1233 of the PCB.

According to various embodiments, a first radiation path formed by the left bezel part 1212 may include a first loop-type radiation area (area ① of FIG. 12A) in which the feeding part 1233 of the PCB is electrically connected with the feeding piece 12121 and is grounded to a ground part 1243 of the PCB through a first bezel fixing piece 12213 of a support plate 1222 fixed to the left bezel part 1212 and a ground pad 12216 formed on a PCB connection part 12215 of a flexible printed circuit board 1221.

Further, referring to FIG. 12B, a second radiation path formed by the left bezel part 1212 may include a second loop-type radiation area (area ② of FIG. 12B) in which the feeding part 1233 of the PCB is electrically connected with the feeding piece 12121 and is grounded to the ground part 1243 of the PCB through a second bezel fixing piece 12214 of the support plate 1222 fixed to the left bezel part 1212 and the ground pad 12216 formed on the PCB connection part 12215 of the flexible printed circuit board 1221.

According to various embodiments, the operating band formed by the first radiation path may include a frequency band higher than the operating band formed by the second radiation path. This is because the physical length according to the ground position of the left bezel part of the first radiation path is shorter than that according to the ground position of the left bezel part of the second radiation path.

The description of the present disclosure has been illustratively given using the two ground paths included in the side key assembly, but is not limited thereto. For example, using various electronic components that have one ground path or two or more ground paths, a metal bezel may be used as an antenna radiator that operates in various operating frequency bands.

According to various embodiments, an electric-shock prevention circuit 1231 for preventing an electric shock and discharging static electricity electro-static discharge (ESD) and a matching circuit 1232 for tuning the antenna radiator to a desired frequency band may be further included since the feeding pad 1230 of the PCB makes direct physical contact with a metal bezel 1210 that forms the exterior of an electronic device. According to an embodiment, an electric-shock prevention circuit 1241 and a matching circuit 1242 for tuning the antenna radiator to a desired frequency band may be further included between the ground pad 12216 and the ground part 1243 of the PCB since the metal bezel 1210 makes direct physical contact with the PCB through the ground pad 12216.

Although not illustrated, an electric-shock prevention circuit and a matching circuit may also be included on the line 1251 that is electrically connected to the upper bezel part 1213, which is used as the main antenna radiator of the electronic device, and the feeding part 1250 of the PCB.

According various embodiments, the metal bezel and a metal component may not be directly connected to each other, but may be connected to each other by a separate electrical connection member. According to an embodiment, the electrical connection member may include at least one of a metal wire, a flexible printed circuit board, or a C-clip. According to an embodiment, in a case where a C-clip is used, a recess may be formed in a corresponding portion of the metal bezel, the C-clip may be seated on and fixed to the recess, and a part of the C-clip may protrude so as to be electrically connected to an electronic component or the ground part of the PCB. According to an embodiment, the metal component and the ground part of the PCB may also not be directly connected to each other, but may be connected to each other by the above-described electrical connection member.

Figure 13A:
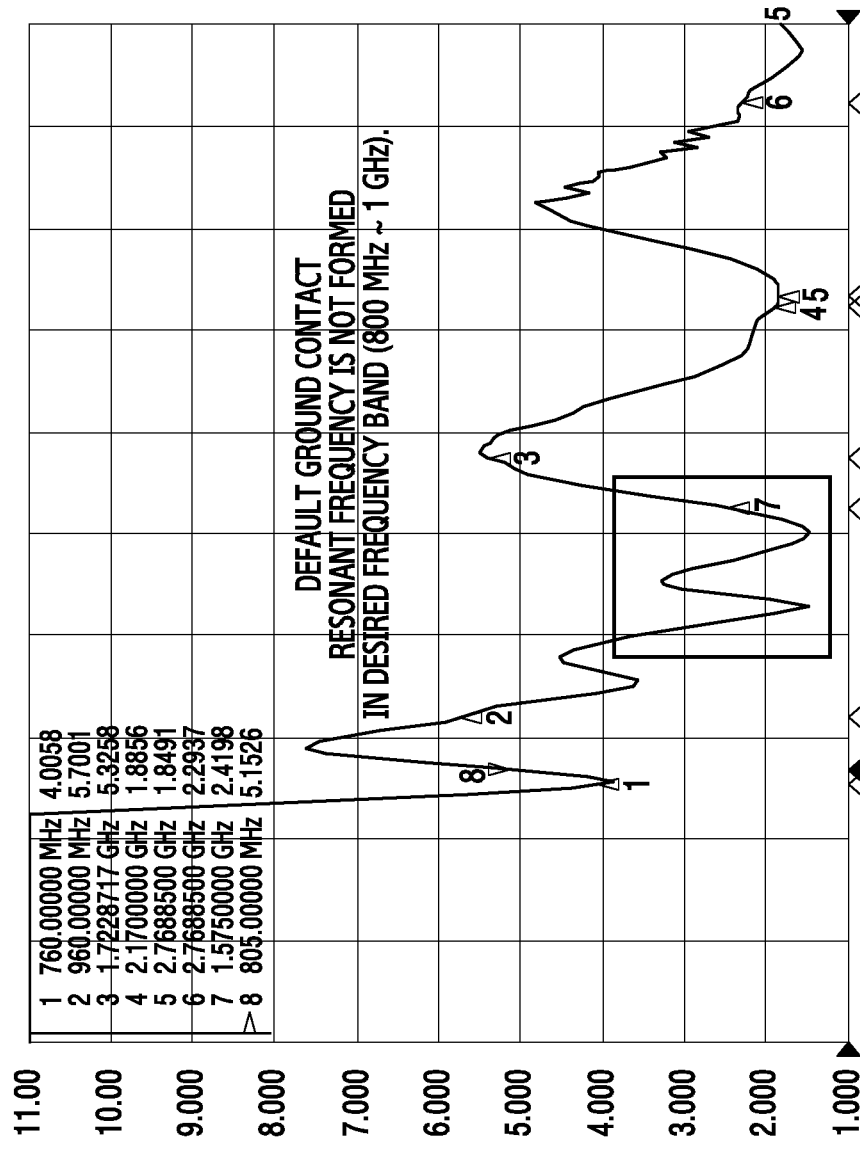
FIGS. 13A to 13C illustrate graphs of a VSWR by an antenna device that operates in individual operating bands according to various embodiments of the present disclosure.
Figure 13B:
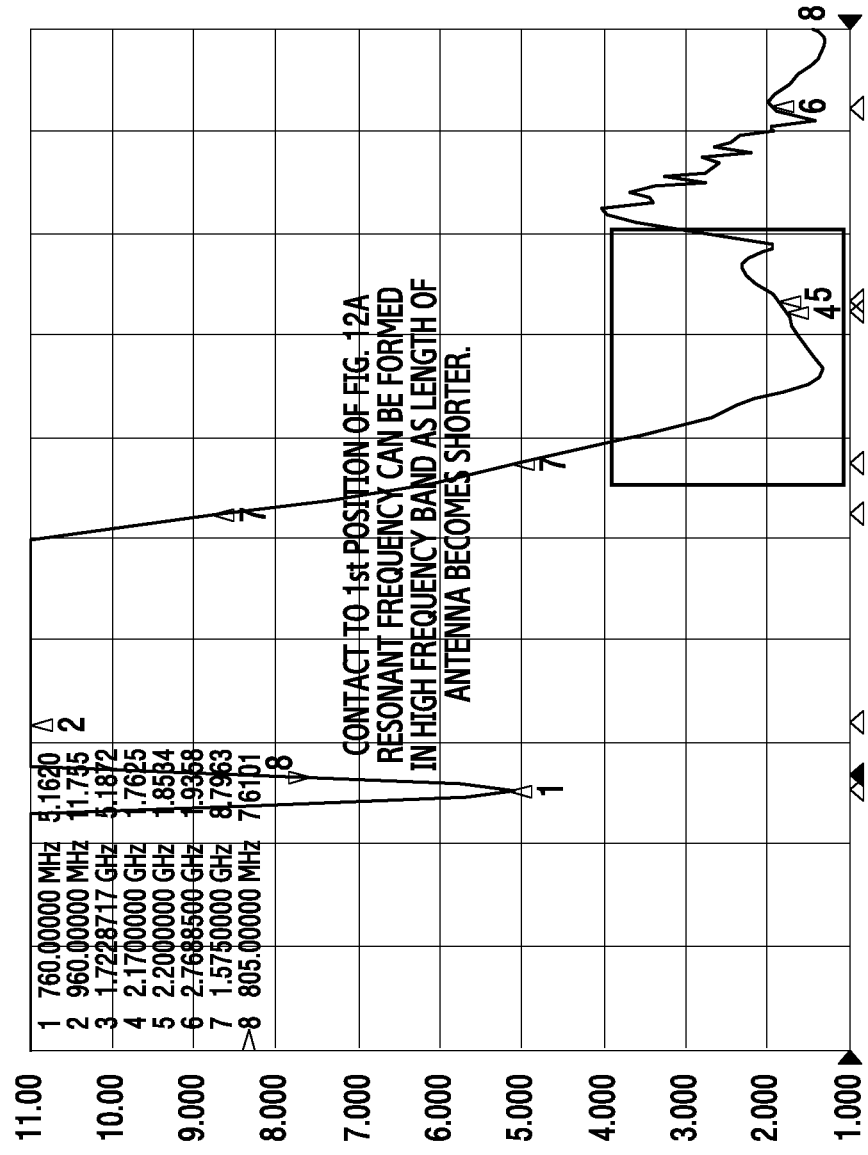
Figure 13C:
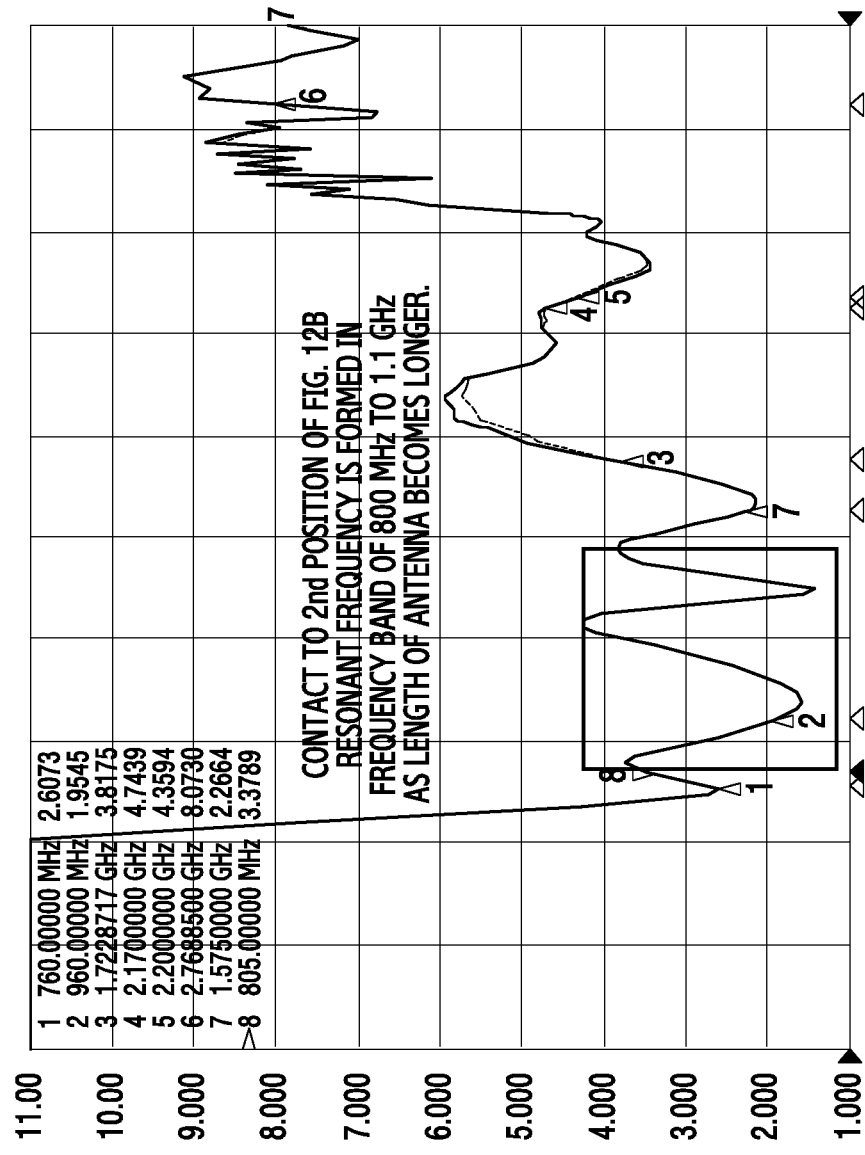

FIGS. 13A to 13C illustrate a VSWR by an antenna device of FIG. 9 that operates in individual operating bands according to various embodiments of the present disclosure.

FIG. 13A illustrates a case where the ground position is implemented in area D of FIG. 9. It can be seen that the resonant frequency of the left bezel part, which is used as an antenna radiator, is not formed in the desired band (800 MHz to 1 GHz).

FIG. 13B illustrates a case where the ground position is implemented by the first radiation path of FIG. 12A. It can be seen that the resonant frequency is formed in a high frequency band as the electrical length of the antenna becomes shorter.

FIG. 13C illustrates a case where the ground position is implemented by the second radiation path of FIG. 12B. It can be seen that the resonant frequency is formed in a low frequency band (800 MHz to 1 GHz) as the electrical length of the antenna becomes longer.

According to various embodiments, although not illustrated, the left bezel part may be used as a single-band antenna radiator by selectively implementing the first and second radiation paths. According to an embodiment, the left bezel part may also be used as a multiband antenna radiator by forming a resonant frequency in a desired high frequency band and a resonant frequency in a desired low frequency band together by implementing both the first radiation path and the second radiation path.

According to the various embodiments, the antenna device is grounded to the PCB in a desired position of the metal member by using the basically provided electronic component so that it is possible to exclude a separate electrical connection member, thereby reducing the cost, maximizing the use of space, enhancing the degree of freedom of the design of the antenna radiator, and making the electronic device slim.

Various embodiments may provide an antenna device that is implemented to be grounded in a desired position of a metal member without a separate electrical connection member, and may provide an electronic device that includes the same.

Various embodiments may provide an antenna device that is implemented such that the electrical length of an antenna radiator for the operation in a desired frequency band can be easily designed, and may provide an electronic device that includes the same.

Various embodiments may provide an antenna device that is grounded to a PCB using a basically provided electronic component to maximize the use of space, thereby resulting in the slimness of an electronic device, and may provide an electronic device that includes the same.

Various embodiments may provide an electronic device that includes: an external housing that includes a first surface directed in a first direction, a second surface directed in a second direction opposite to the first direction, and a side surface configured to surround at least a part of the space between the first and second surfaces; a printed circuit board (PCB) disposed within the external housing; a communication circuit disposed on the printed circuit board; at least one ground member electrically connected with the printed circuit board; an antenna radiator electrically connected with the communication circuit and configured to form at least a part of the side surface of the external housing; a conductive structure electrically connected with the at least one ground member and inserted between the printed circuit board and the antenna radiator; and a non-conductive member configured to form another part of the side surface of the external housing and to electrically isolate the antenna radiator while making contact with the antenna radiator, and the antenna radiator may include: a first portion located a first distance from the non-conductive member and electrically connected with the communication circuit; a second portion located a second distance, which is larger than the first distance, from the non-conductive member and electrically connected with the ground member; and a third portion located a third distance, which is larger than the second distance, from the non-conductive member and electrically connected with the ground member.

According to various embodiments, the communication circuit may be configured to transmit a first signal having a first frequency band to the outside using a portion between the first and second portions of the antenna radiator and to transmit a second signal having a second frequency band to the outside using a portion between the first and third portions of the antenna radiator.

According to various embodiments, the first frequency band may include a frequency higher than the second frequency band.

According to various embodiments, the side surface of the external housing may include a first side and a second side; the antenna radiator may form at least a part of the first side and at least a part of the second side; and another antenna radiator disposed to be spaced apart from the antenna radiator may form at least one other part of the first side.

According to various embodiments, the second portion and the third portion may be disposed on the second side.

According to various embodiments, the electronic device may further include another non-conductive member, and the conductive structure may be insulated from the remaining portions of the antenna radiator other than the second and third portions through the other non-conductive member.

Various embodiments may provide an electronic device that includes: a metal member configured to have a length that contributes to at least a part of the electronic device; a printed circuit board (PCB) configured to be feed-connected to a preset position of the metal member in order to apply the metal member as an antenna radiator; and at least one electronic component electrically connected to a position different from the feeding position of the metal member and grounded to the PCB.

According to various embodiments, for the electronic component, a radiation path that has the ground position that is disposed close to the feeding position may operate in a higher frequency band than a radiation path that has the ground position that is disposed relatively far away from the feeding position.

According to various embodiments, the metal member may be a metal bezel or a decoration member that is disposed such that at least a part thereof is exposed to the outside of the electronic device.

According to various embodiments, the electronic device may further include a display, and the metal member may be disposed in such a manner that the metal member surrounds at least a part of the outer periphery of the display.

According to various embodiments, the metal member may be formed in a closed-loop type.

According to various embodiments, the electronic device may be a wearable electronic device that is worn on a part of a user's body.

According to various embodiments, the electronic component may include at least one of a speaker device, a microphone device, various types of FPCBs, an interface connector port, a camera device, a display, a touch panel, a vibration motor, or a side key assembly.

According to various embodiments, in a case where the electronic component is a side key assembly, the side key assembly may include: a key button disposed in such a manner that at least a part thereof is exposed, or protrudes, to the outside through a side surface of the metal member; a metal support plate configured to support the key button and electrically connected to the metal member; and a flexible printed circuit board (FPCB) disposed between the key button and the support plate, the FPCB being electrically connected to the support plate in at least one position and being grounded to the PCB.

According to various embodiments, the flexible printed circuit board may have at least one exposed portion formed therein, through which a pattern electrically connected with a ground pad that is grounded to a ground part of the PCB is exposed, and the exposed portion may be electrically connected with the support plate by a physical contact therebetween.

According to various embodiments, the flexible printed circuit board may have a pair of exposed portions formed at opposite ends thereof, through which a pattern electrically connected with a ground pad that is grounded to a ground part of the PCB is exposed, and at least one of the pair of exposed portions may be electrically connected with the support plate by a physical contact therebetween.

According to various embodiments, the metal member may operate as a multiband antenna radiator by the electrical lengths between the pair of exposed portions and the feeding position when the pair of exposed portions is connected with the support plate.

Various embodiments may provide an electronic device that includes: a metal member configured to have a length that contributes to at least a part of the electronic device; a printed circuit board (PCB) configured to be feed-connected to a preset position of the metal member in order to apply the metal member as an antenna radiator; and a side key assembly electrically connected to a position different from the feeding position of the metal member and grounded to the PCB.

The embodiments of the present disclosure disclosed in the specification and the drawings are only particular examples proposed in order to easily describe the technical matters of the present disclosure and help with comprehension of the present disclosure, and do not limit the scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable communication device comprising:
    a communication circuitry disposed on a printed circuit board (PCB) including at least one ground portion formed therein; and
    a housing accommodating the PCB and forming a side surface of the portable communication device, the side surface including a first conductive portion and a second conductive portion separated from each other by a non-conductive portion disposed therebetween, the first conductive portion and being substantially straight and the second conductive portion formed to include at least one corner of the housing;
    wherein the first conductive portion is electrically coupled to the communication circuitry via a first feed connection and adapted to function as a first radiating element;
    wherein the second conductive portion is electrically coupled to the communication circuitry via a second feed connection different from the first feed connection and adapted to function as a second radiating element; and
    wherein the second conductive portion is electrically coupled to the at least one ground portion via at least two ground connections.

2. The portable communication device of claim 1, wherein the first feed connection includes a first c-clip and the second feed connection includes a second c-clip.

3. The portable communication device of claim 1, wherein the second conductive portion is configured to radiate signals having different frequencies from each other through the at least two ground connections.

4. The portable communication device of claim 1, wherein the communication circuitry is configured to:
    transmit a first signal corresponding to a first frequency band via the second conductive portion; and
    transmit a second signal corresponding to a second frequency band via the second conductive portion, the second frequency band different from the first frequency band.

5. The portable communication device of claim 1, wherein:
    the at least two ground connections include a first ground connection and a second ground connection,
    the first ground connection is electrically coupled to a first point of the second conductive portion, and
    the second ground connection is electrically coupled to a second point of the second conductive portion, the second point different from the first point.

6. The portable communication device of claim 5, wherein:
    a first area of the second conductive portion between the second feed connection and the first ground connection is configured to radiate a first signal corresponding to a first frequency band, and
    a second area of the second conductive portion between the second feeding connection and the second ground connection is configured to radiate a second signal corresponding to a second frequency band different from the first frequency band.

7. The portable communication device of claim 6, wherein the first frequency band is higher than the second frequency band.

8. The portable communication device of claim 5, wherein:
    the second feed connection is electrically coupled to a third point of the second conductive portion, and
    the third point is closer to the non-conductive portion than the first point.

9. The portable communication device of claim 8, wherein the first point is closer to the non-conductive portion than the second point.

10. The portable communication device of claim 1, wherein the at least one corner is rounded.

11. The portable communication device of claim 1, wherein:
the at least two ground connections include a first ground connection and a second ground connection, and
the first ground connection includes a third c-clip and the second ground connection includes a fourth c-clip.

12. The portable communication device of claim 1, further comprising:
another dielectric material disposed at an end of the first conductive portion opposite to another end of the first conductive portion on which the non-conductive portion is disposed.

13. The portable communication device of claim 1, wherein the first conductive portion is substantially perpendicular to at least part of the second conductive portion.

14. A portable communication device comprising:
a communication circuitry disposed on a printed circuit board (PCB) including at least one ground portion formed therein; and
a housing accommodating the PCB and including a side member forming at least portion of a side surface of the portable communication device, the side member including a first conductive portion and a second conductive portion separated from each other by a non-conductive portion disposed therebetween, the first conductive portion having a first length and being substantially straight and the second conductive portion having a second length longer than the first length and formed to include at least one corner of the housing;
wherein the first conductive portion is electrically coupled to the communication circuitry via a first feed connection and adapted to function as a first radiating element;
wherein the second conductive portion is electrically coupled to the communication circuitry via a second feed connection different from the first feed connection and adapted to function as a second radiating element; and
wherein the second conductive portion is electrically coupled to the at least one ground portion via at least two ground connections.

15. The portable communication device of claim 14, wherein the first feed connection includes a first c-clip and the second feed connection includes a second c-clip.

16. The portable communication device of claim 15, wherein the second conductive portion is configured to radiate signals having different frequencies from each other through the at least two ground connections.

17. The portable communication device of claim 14, wherein the communication circuitry is configured to:
transmit a first signal corresponding to a first frequency band via the second conductive portion; and
transmit a second signal corresponding to a second frequency band via the second conductive portion, the second frequency band different from the first frequency band.

18. The portable communication device of claim 14, wherein:
the at least two ground connections include a first ground connection and a second ground connection,
the first ground connection is electrically coupled to a first point of the second conductive portion,
the second ground connection is electrically coupled to a second point of the second conductive portion, the second point different from the first point,
a first area of the second conductive portion between the second feed connection and the first ground connection is configured to radiate a first signal corresponding to a first frequency band, and
a second area of the second conductive portion between the second feeding connection and the second ground connection is configured to radiate a second signal corresponding to a second frequency band different from the first frequency band.

* * * * *